(12) United States Patent
Graham

(10) Patent No.: US 9,435,468 B2
(45) Date of Patent: Sep. 6, 2016

(54) CONSTRUCTION OF PIPES

(75) Inventor: Neil Deryck Bray Graham, Coogee Beach (AU)

(73) Assignee: Long Pipes (Pty) Ltd., Coogee Beach, Western Australia (AU)

(*) Notice: Subject to any disclaimer, the term of this patent is extended or adjusted under 35 U.S.C. 154(b) by 680 days.

(21) Appl. No.: 14/353,908

(22) PCT Filed: Oct. 31, 2011

(86) PCT No.: PCT/AU2011/001401
§ 371 (c)(1),
(2), (4) Date: Apr. 24, 2014

(87) PCT Pub. No.: WO2012/054992
PCT Pub. Date: May 3, 2012

(65) Prior Publication Data
US 2014/0261843 A1    Sep. 18, 2014

(30) Foreign Application Priority Data

Oct. 29, 2010    (AU) ................... 2010904841

(51) Int. Cl.
*F16L 55/16* (2006.01)
*F16L 11/04* (2006.01)
(Continued)

(52) U.S. Cl.
CPC ............... *F16L 11/04* (2013.01); *B29C 53/48* (2013.01); *B29C 63/343* (2013.01); *B29C 70/50* (2013.01);
(Continued)

(58) Field of Classification Search
CPC .................... F16L 13/147; F16L 55/1656
USPC ...... 138/98, 97; 405/184.2, 150.1; 428/35.2, 428/36.91
See application file for complete search history.

(56) References Cited

U.S. PATENT DOCUMENTS

| 3,329,173 A | 7/1967 | Skoggard et al. |
| 4,009,063 A | 2/1977 | Wood |

(Continued)

FOREIGN PATENT DOCUMENTS

| CA | 843231 A | 6/1970 |
| EP | 114361 A2 | 8/1984 |

(Continued)

OTHER PUBLICATIONS

International Search Report (ISR) and written opinion for PCT Patent Application PCT/AU2011/001401, mailed Feb. 29, 2012.

*Primary Examiner* — Patrick F Brinson
(74) *Attorney, Agent, or Firm* — Matthew J. Lattig; Charter IP, LLC

(57) ABSTRACT

An elongate hollow structure and method of constructing the hollow structure is described, the hollow structure including a radially inner portion and a radially outer portion merging together to form a tubular wall structure. The method includes providing the radially inner portion, assembling the radially outer portion about the radially inner portion, and radially expanding the inner portion. The outer portion comprises an outer layer of fiber reinforced composite construction surrounded by a flexible outer casing. A space is provided between the radially inner portion and flexible outer casing. The outer layer includes reinforcement and a binder. The flexible outer casing resists radial expansion of the reinforcement, subjecting it to radial compression. The radially expanding inner portion cooperates with the flexible outer casing to cause the volume of the space to progressively decrease, causing the binder to spread through the space between the radially inner portion and flexible outer casing.

33 Claims, 29 Drawing Sheets

(51) Int. Cl.

| | |
|---|---|
| *B29C 53/48* | (2006.01) |
| *B29C 63/34* | (2006.01) |
| *B29D 23/00* | (2006.01) |
| *B29D 23/18* | (2006.01) |
| *B32B 1/08* | (2006.01) |
| *B32B 5/02* | (2006.01) |
| *B32B 5/12* | (2006.01) |
| *B32B 5/26* | (2006.01) |
| *B32B 13/14* | (2006.01) |
| *B32B 27/32* | (2006.01) |
| *B32B 27/40* | (2006.01) |
| *F16L 9/14* | (2006.01) |
| *F16L 55/165* | (2006.01) |
| *F16L 13/14* | (2006.01) |
| *B29C 70/50* | (2006.01) |
| *B29C 53/06* | (2006.01) |
| *B29C 53/38* | (2006.01) |
| *B29C 65/50* | (2006.01) |
| *B29C 65/52* | (2006.01) |
| *B29C 65/00* | (2006.01) |
| *B29C 65/48* | (2006.01) |
| *B29C 63/28* | (2006.01) |

(52) U.S. Cl.
CPC ............ *B29D 23/001* (2013.01); *B29D 23/18* (2013.01); *B32B 1/08* (2013.01); *B32B 5/02* (2013.01); *B32B 5/12* (2013.01); *B32B 5/26* (2013.01); *B32B 13/14* (2013.01); *B32B 27/32* (2013.01); *B32B 27/40* (2013.01); *F16L 9/14* (2013.01); *F16L 13/147* (2013.01); *F16L 55/1654* (2013.01); *F16L 55/1656* (2013.01); *B29C 53/066* (2013.01); *B29C 53/382* (2013.01); *B29C 63/28* (2013.01); *B29C 63/341* (2013.01); *B29C 65/4815* (2013.01); *B29C 65/5021* (2013.01); *B29C 65/5028* (2013.01); *B29C 65/5042* (2013.01); *B29C 65/52* (2013.01); *B29C 66/1122* (2013.01); *B29C 66/1142* (2013.01); *B29C 66/4322* (2013.01); *B32B 2260/023* (2013.01); *B32B 2260/046* (2013.01); *B32B 2262/101* (2013.01)

(56) References Cited

U.S. PATENT DOCUMENTS

| | | | |
|---|---|---|---|
| 5,501,248 | A | 3/1996 | Kiest, Jr. |
| 5,576,081 | A | 11/1996 | Sandt |
| 6,899,842 | B1 | 5/2005 | Corre et al. |
| 8,562,881 | B2 | 10/2013 | Hofmann |
| 8,580,364 | B2 * | 11/2013 | Quitter ............ B32B 1/08 138/98 |
| 2005/0028880 | A1* | 2/2005 | Smith ............ F16L 55/1656 138/98 |
| 2005/0161100 | A1* | 7/2005 | Pleydon ............ B29D 23/001 138/98 |
| 2007/0113971 | A1* | 5/2007 | Driver ............ B29D 23/001 156/287 |
| 2007/0204952 | A1* | 9/2007 | Driver ............ B29C 63/0021 156/203 |
| 2007/0209726 | A1* | 9/2007 | Driver ............ B29C 63/0021 138/98 |
| 2013/0098495 | A1 | 4/2013 | Fasel et al. |
| 2014/0000812 | A1 | 1/2014 | Schuhn |

FOREIGN PATENT DOCUMENTS

| | | |
|---|---|---|
| JP | 42-003393 A | 11/1963 |
| JP | S61-220830 A | 10/1986 |
| JP | 06-031820 A | 2/1994 |

* cited by examiner

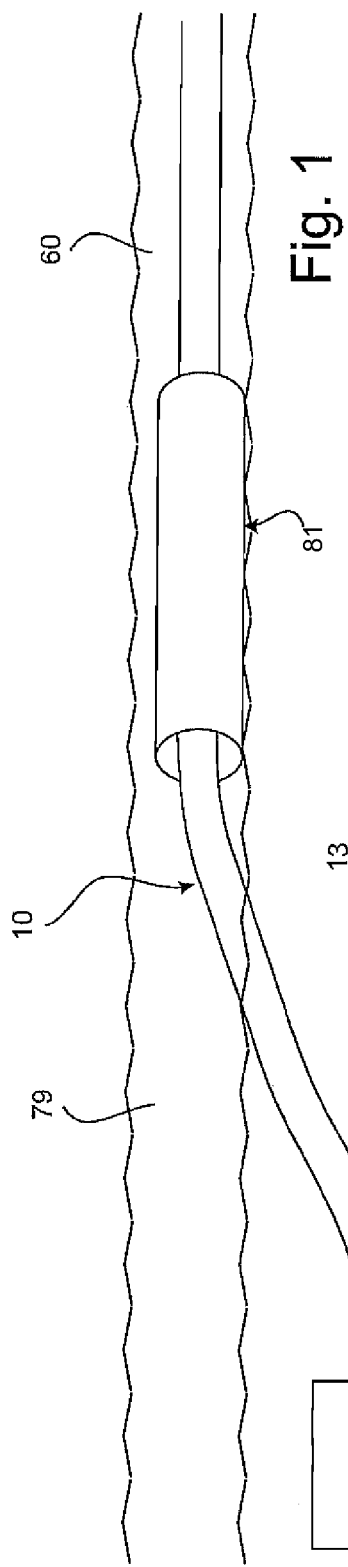
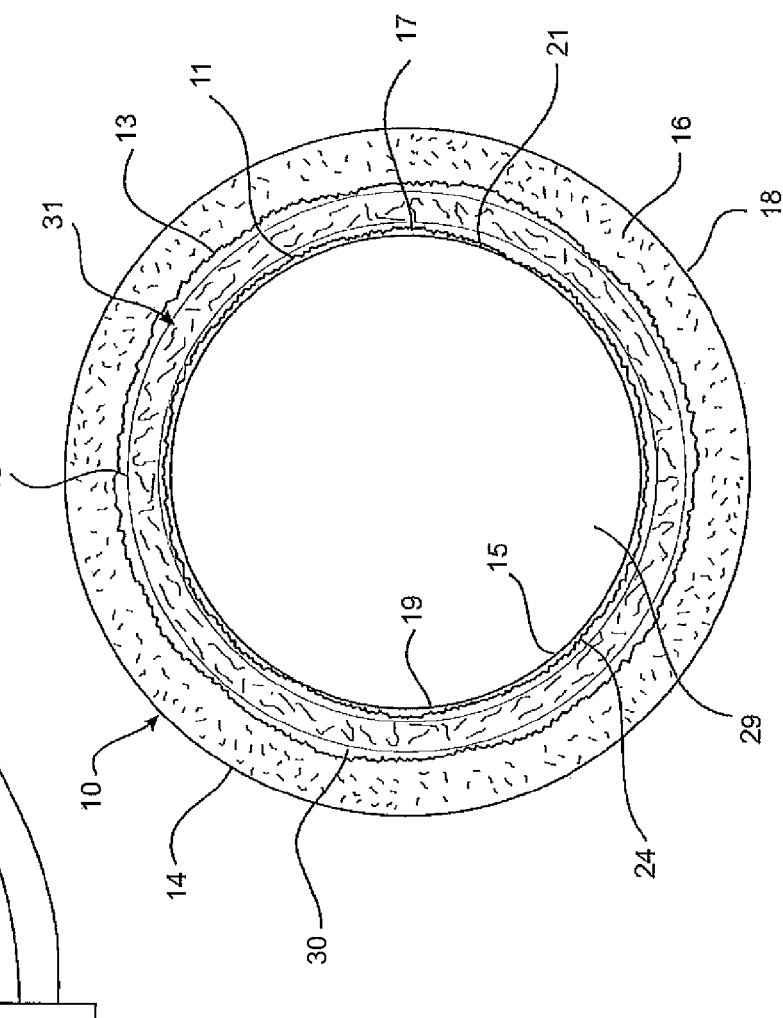

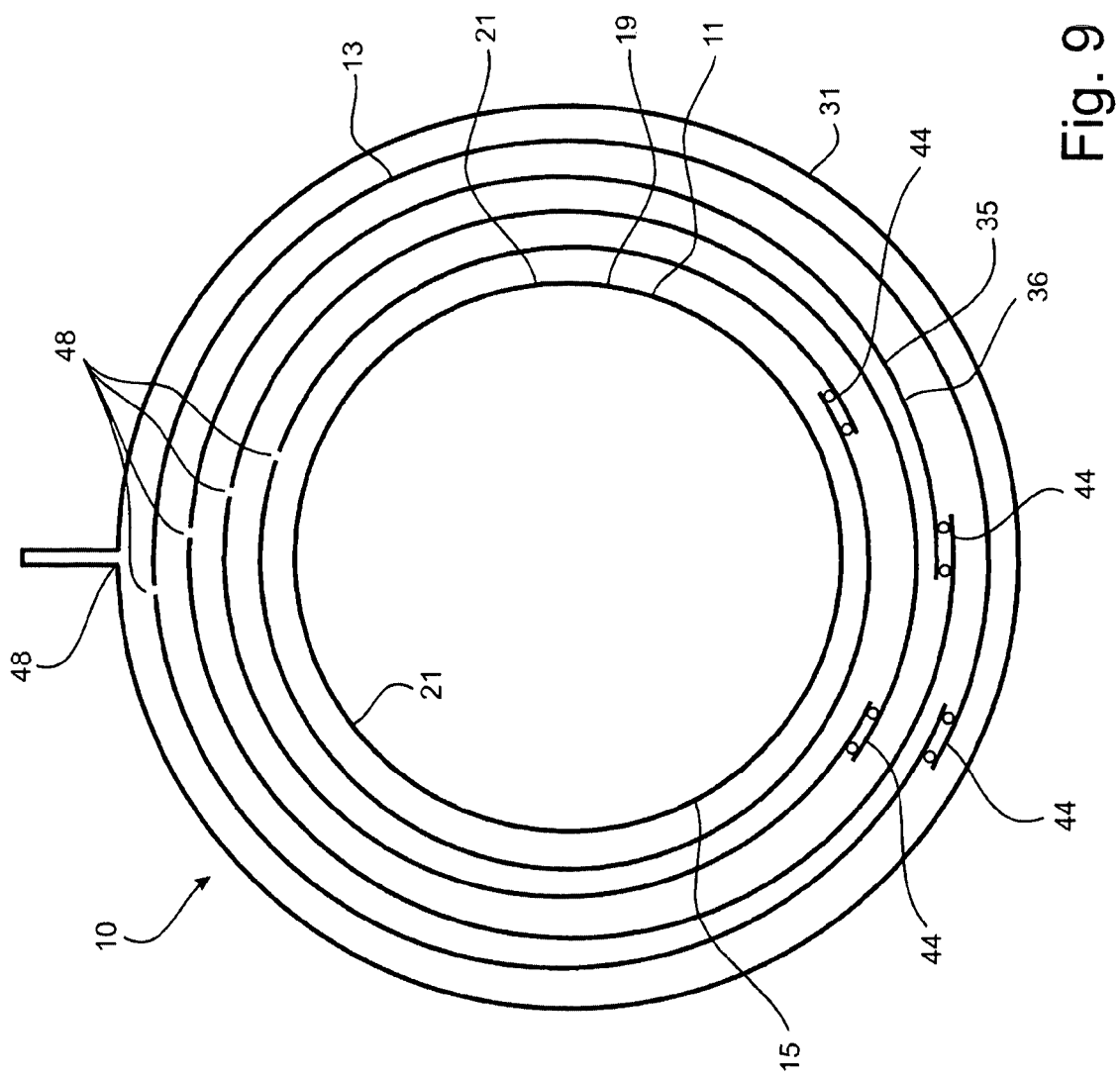

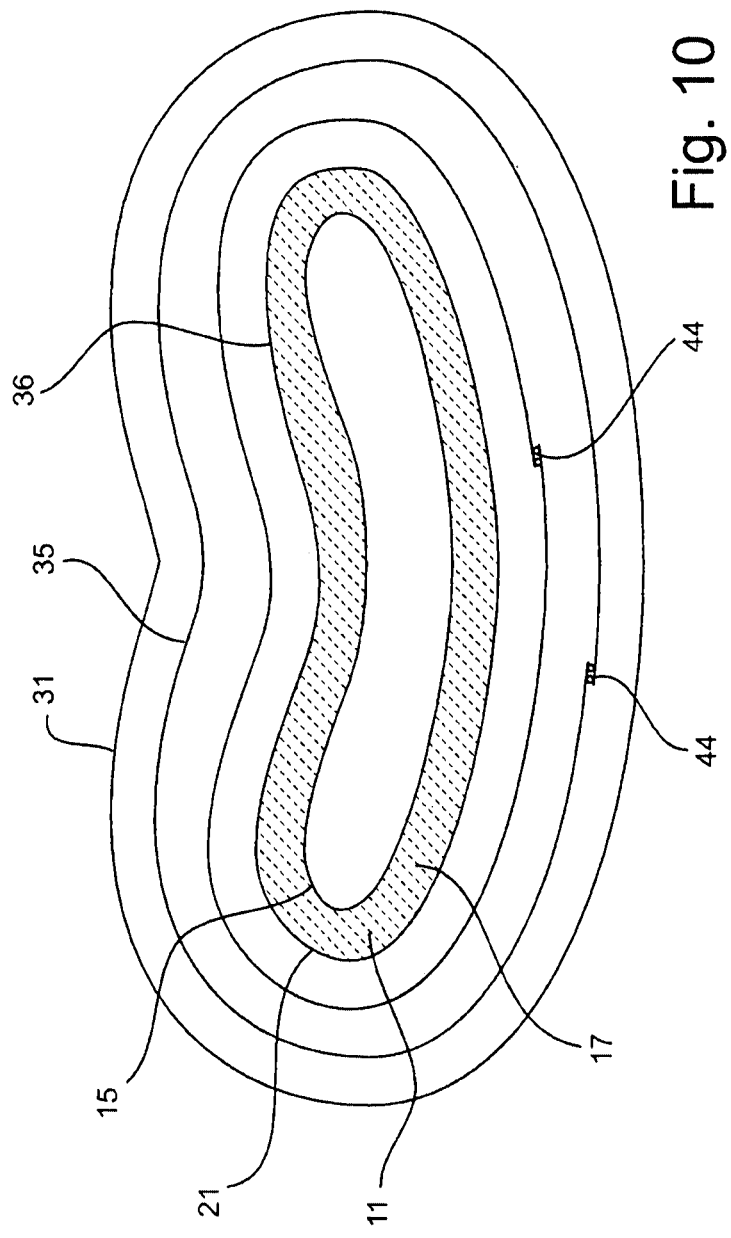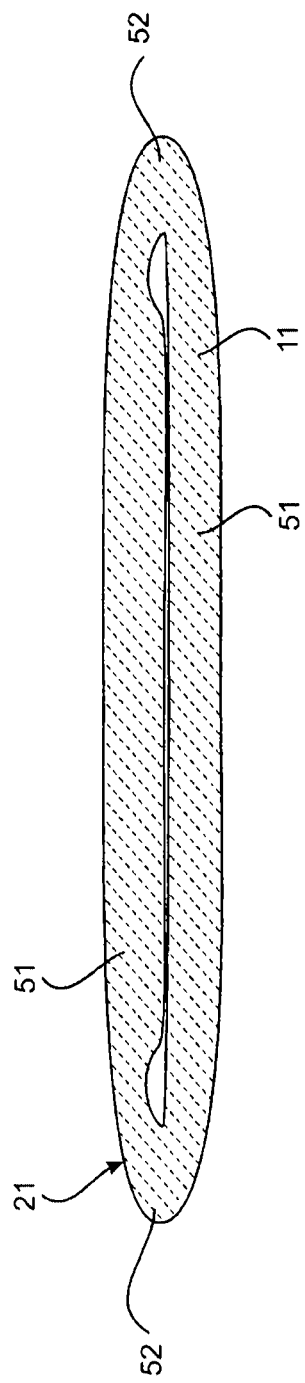

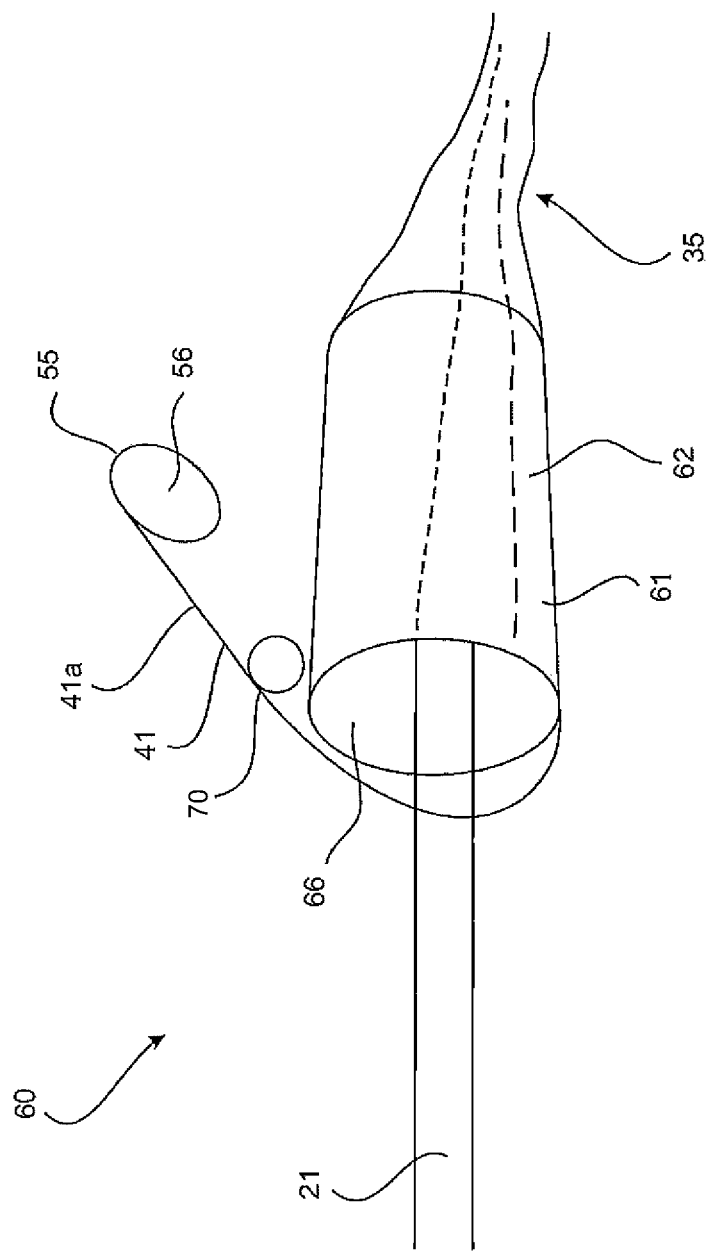

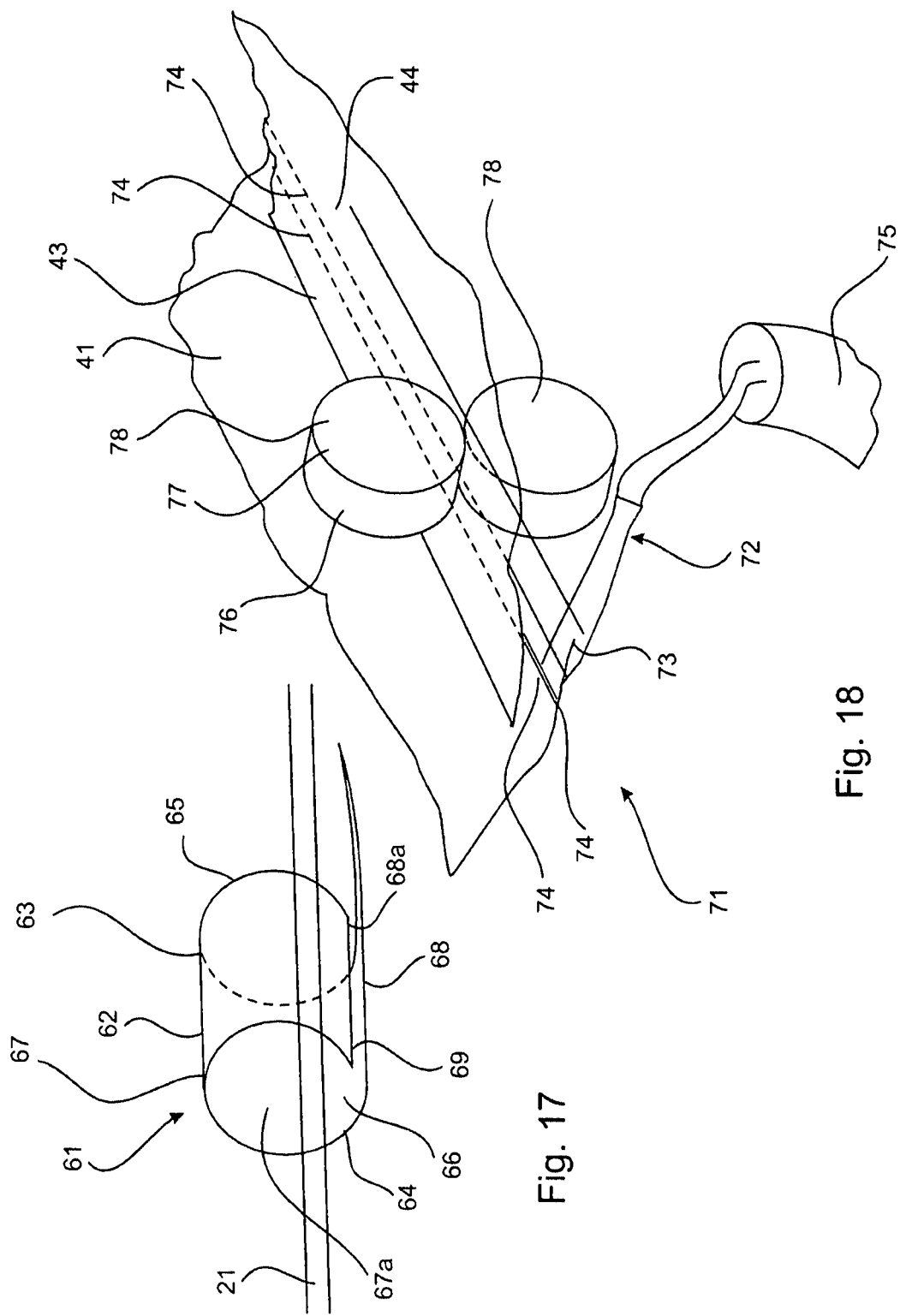

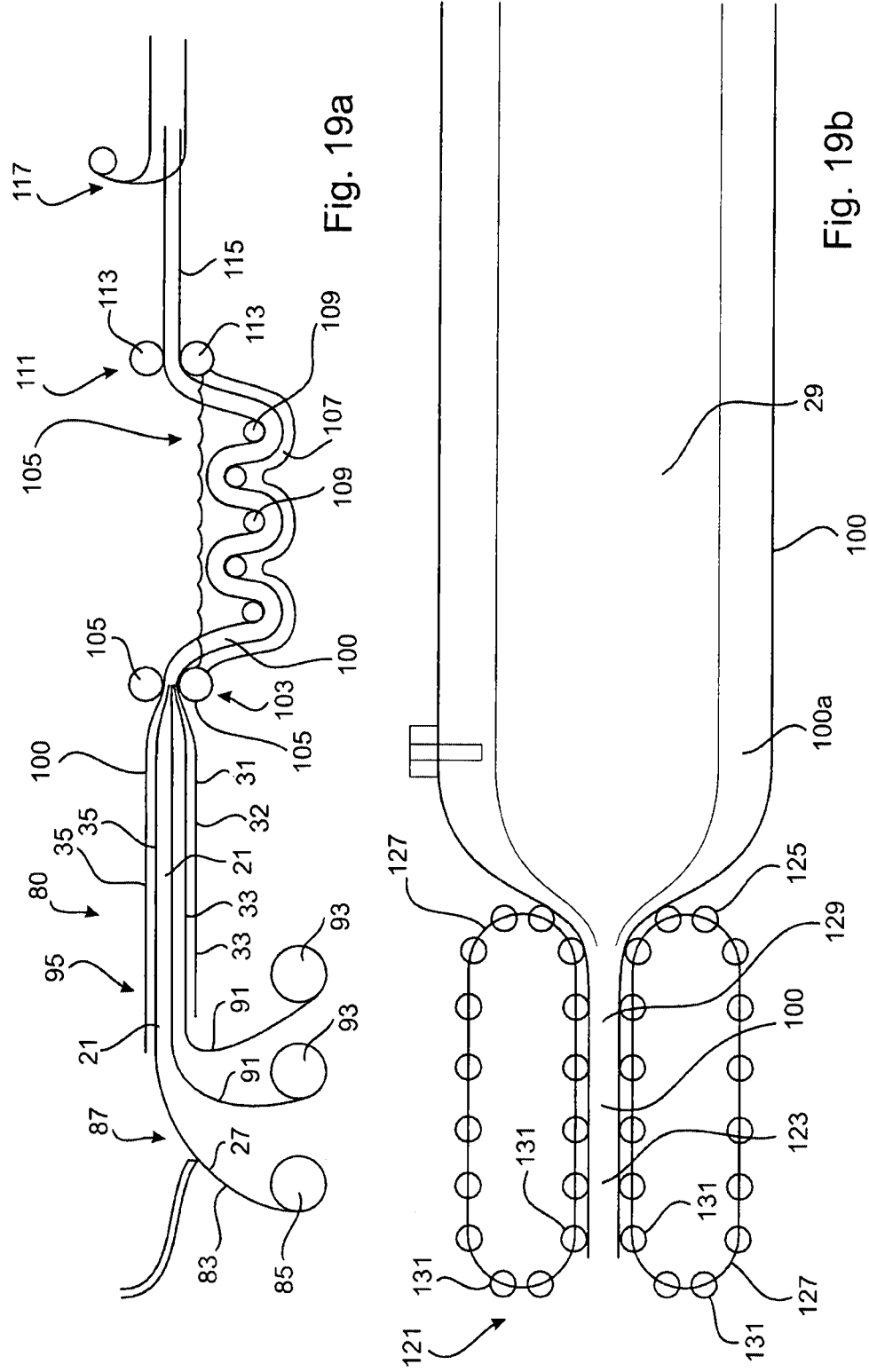

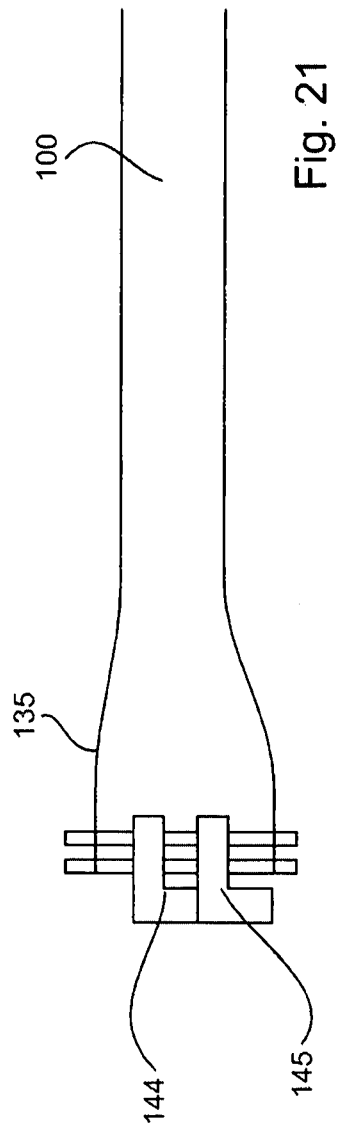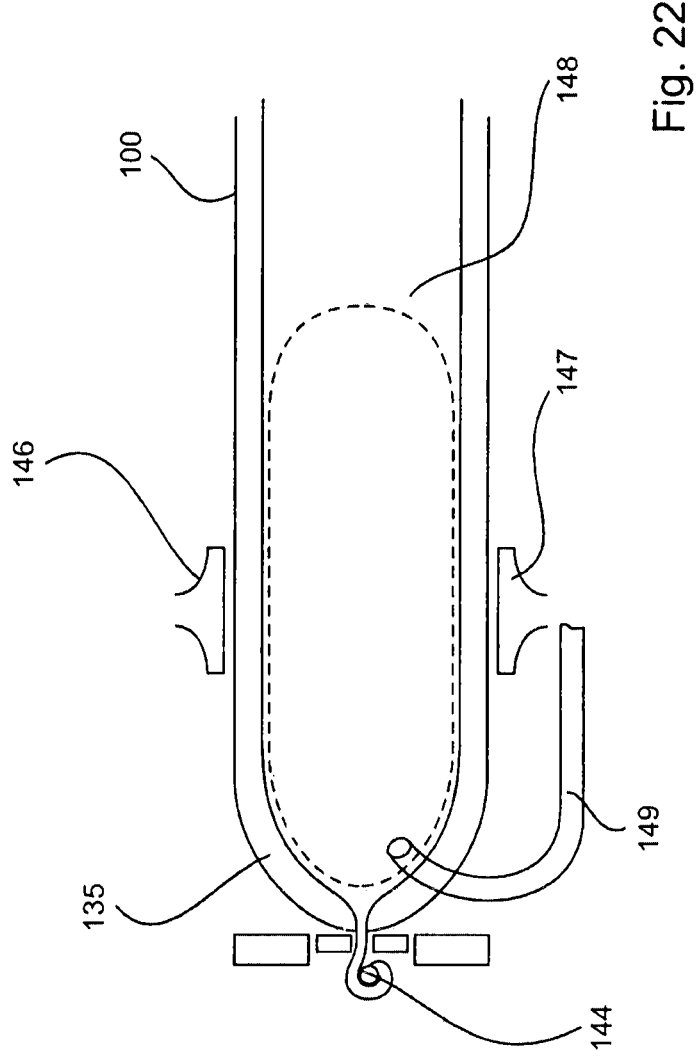

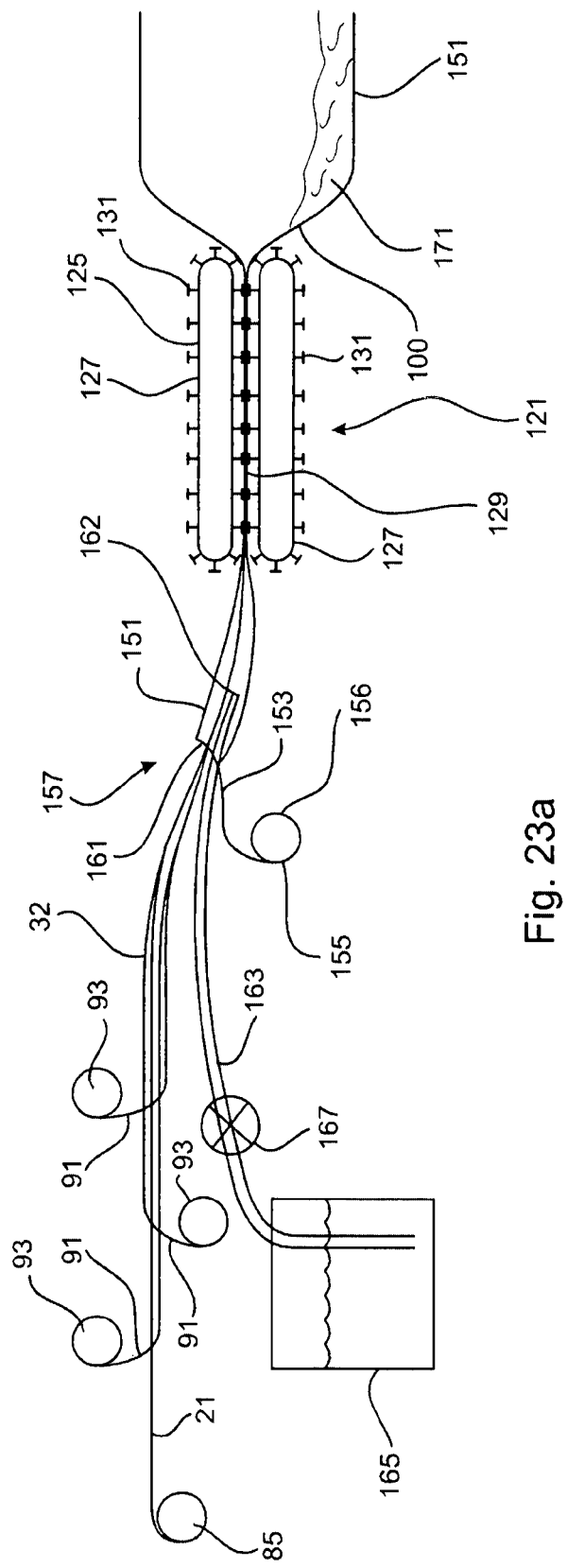
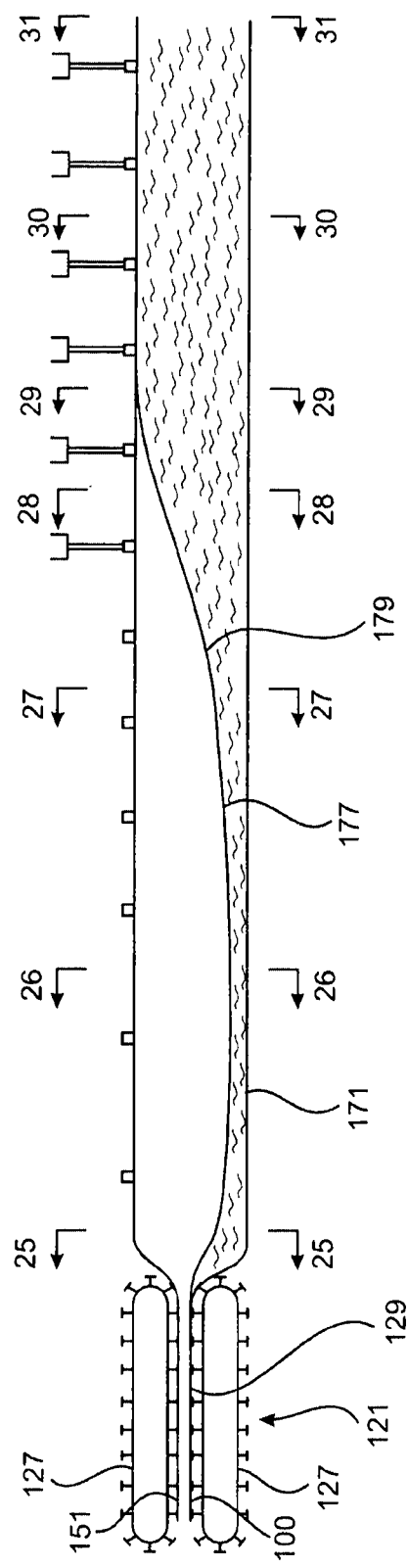
Fig. 23a
Fig. 23b

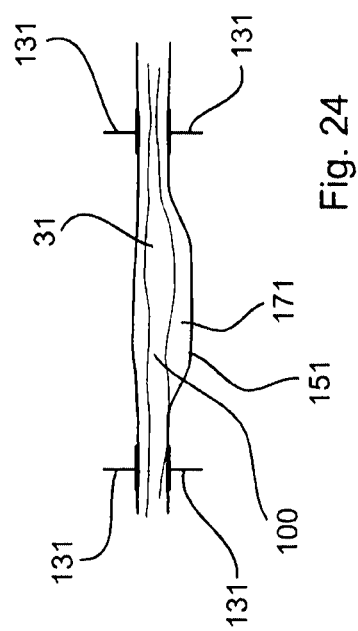
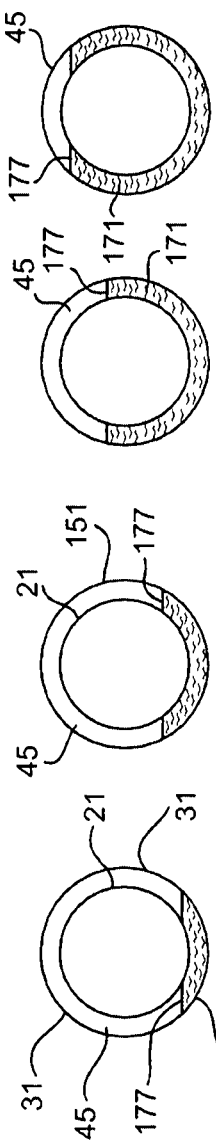

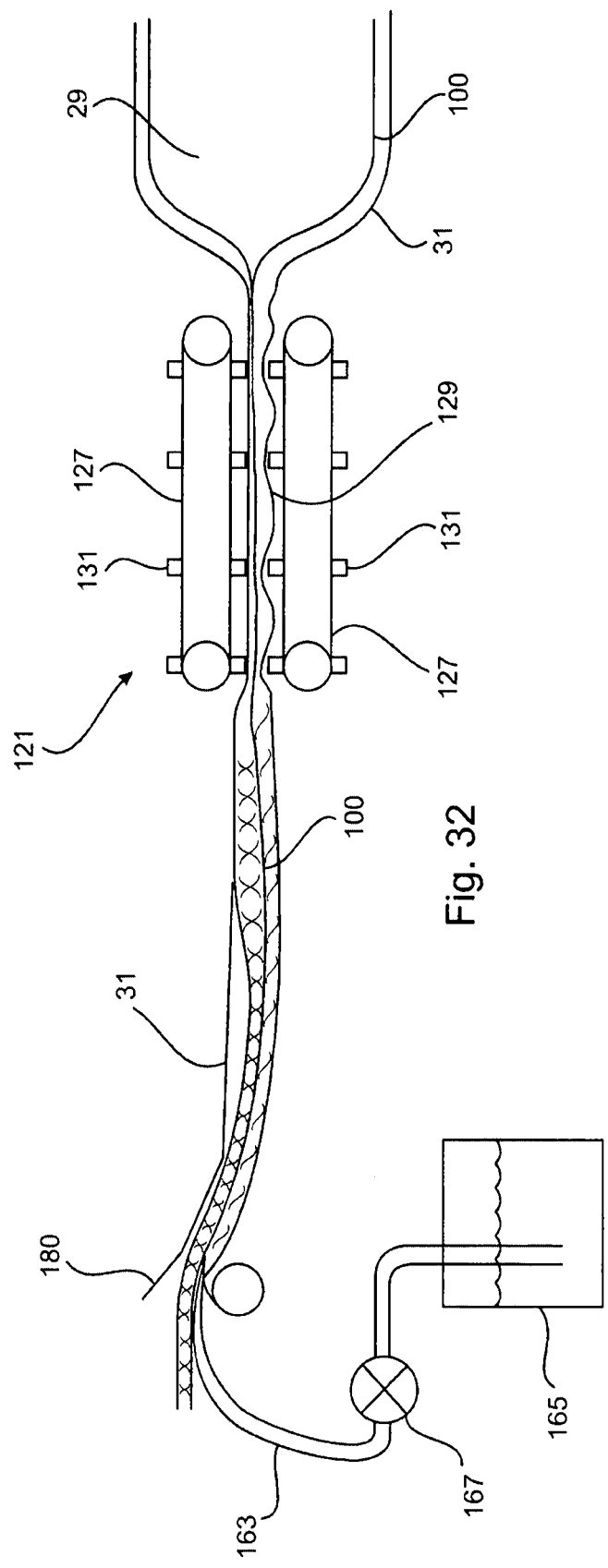
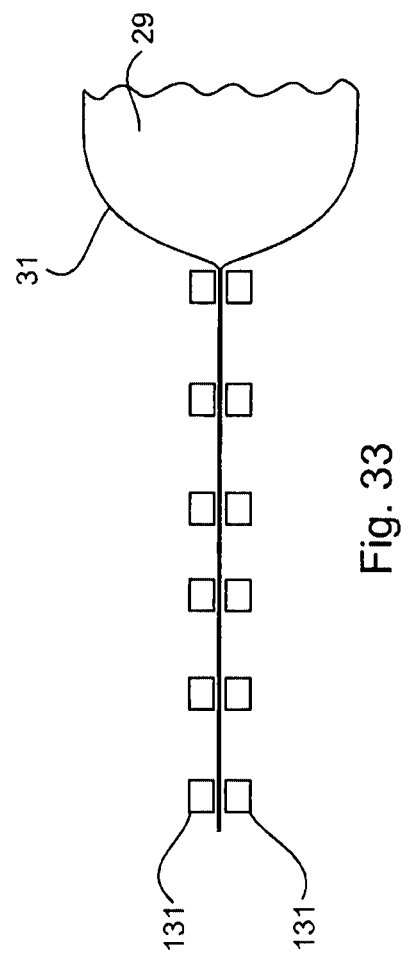
Fig. 32
Fig. 33

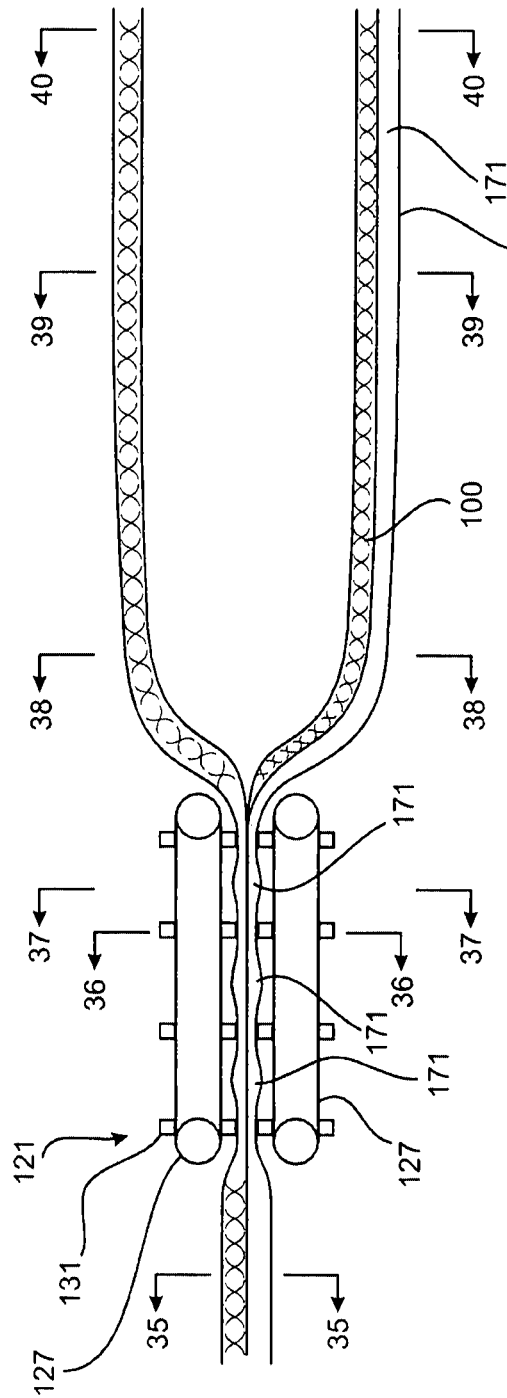
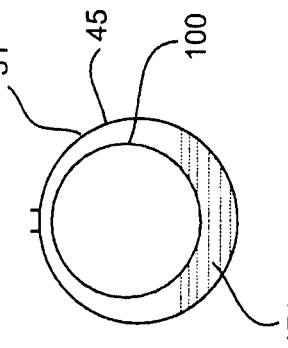
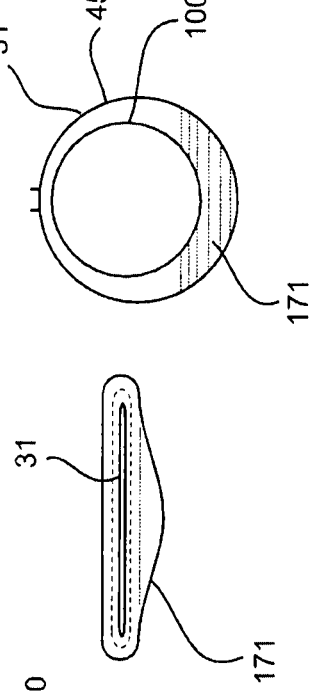
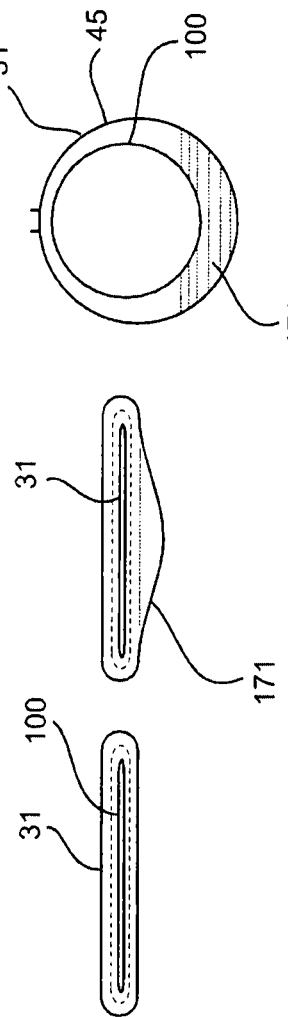
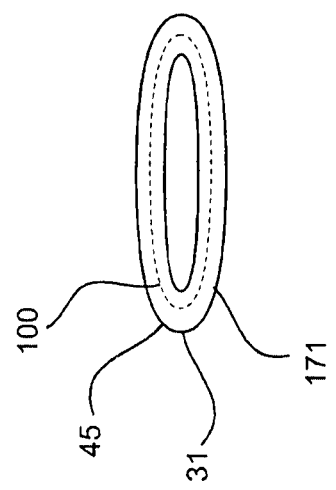

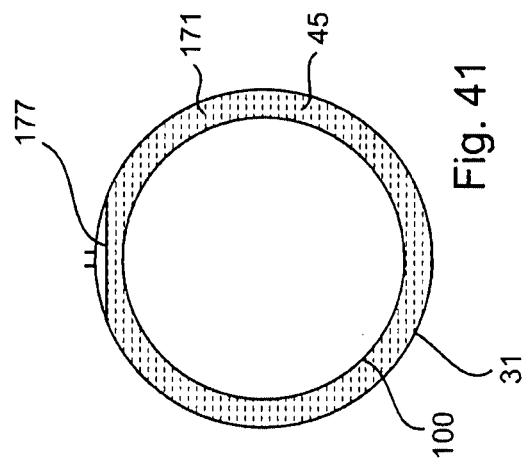
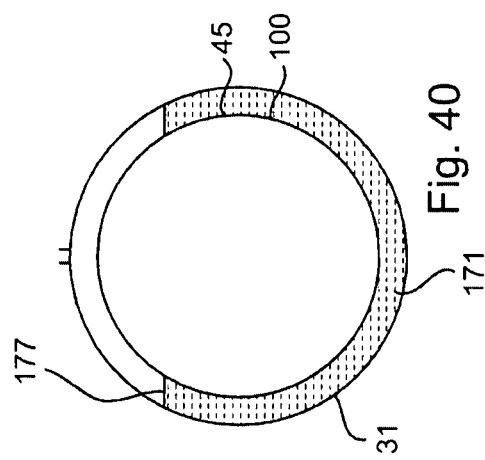
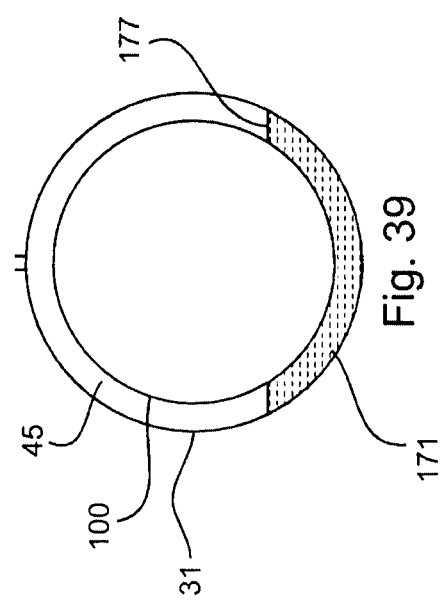
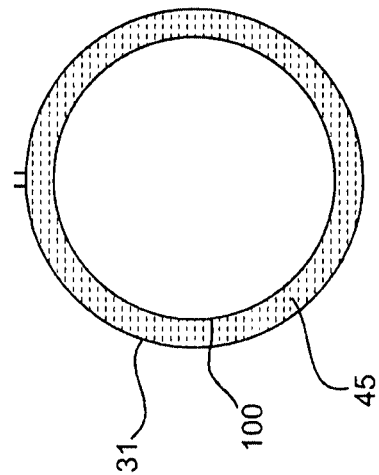

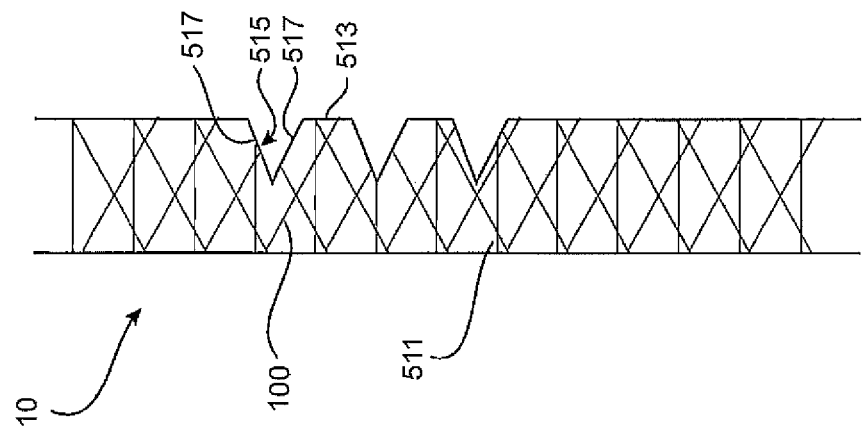
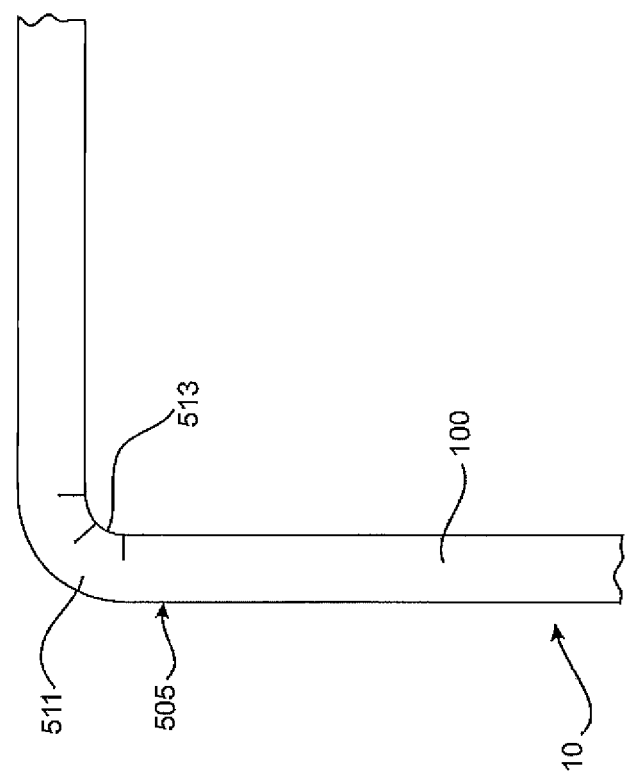

CONSTRUCTION OF PIPES

CROSS-REFERENCE TO RELATED APPLICATION

This application claims the benefit under 35 U.S.C. §365 (b) of PCT/AU2011/001401 to Neil Deryck Bray Graham, filed Oct. 31, 2011 and entitled "CONSTRUCTION OF PIPES", the entire contents of which is hereby incorporated by reference herein.

BACKGROUND

1. Field.

The example embodiments generally relate to elongate hollow structures of composite construction, including in particular tubular structures.

While the example embodiments have been devised particularly in relation to the construction of tubular structures in the form of pipes, it may also be applicable to the construction of other elongate hollow elements including tubular elements such as ducts and tubes, tubular structural elements such as shafts, beams and columns, and other tubular elements of composite construction.

2. Related Art

The following discussion of the background art is intended to facilitate an understanding of the example embodiments of the present invention only. The discussion is not an acknowledgement or admission that any of the material referred to is or was part of the common general knowledge as at the priority date of the application.

It is known to construct pipes using fibre-reinforced plastic composites. Typically, such pipes are constructed by a process in which rovings of filaments of fibre material, (such as glass fibres) are impregnated with a thermosettable resin or thermoplastic composition and wound back and forth on a mandrel to form a pipe wall structure of composite construction.

Further, there have been attempts to produce a continuous pipe by pultrusion involving a wet body of reinforcement fibres being drawn through a heated mould to cure the pipe and the pipe then wound onto a spool. Pipes constructed in this way are typically limited to lengths of about 1 km and diameters of about 100 mm Typically, such pipes are required to bear both hoop and axial stresses, and the construction can be a compromise between the hoop and axial stress bearing properties required for the pipe. Hoop strength can be optimised by winding the reinforcing filaments at an angle approaching 90° to the pipe axis. Axial strength can be optimised by winding the reinforcing filaments at an angle approaching the pipe axis.

The length of pipe that can be constructed in such a way is dictated by the length of the mandrel or the roll of pipe that can be transported. Consequently, the construction process is not conducive to construction of long pipes to form a transportation network for liquids and gasses; that is, pipes which are much longer than available mandrels and also pipes which are of a length to constitute a pipeline extending continuously between two distant locations, perhaps hundreds to thousands of kilometers apart.

It would be advantageous for there to be a way in which a pipeline could be constructed using a pipe constructed on a continuous basis; that is, without having to be composed of a series of pipe sections joined one to another at junctions which are likely constituted areas of weakness in structural integrity of the pipeline It is against this background, and the problems and difficulties associated therewith, that the example embodiments of the present invention have been developed.

SUMMARY

An example embodiment of the present invention is directed to a method of constructing an elongate hollow structure, the elongate hollow structure having a radially inner portion and a radially outer portion, with the two portions merging together to provide an integrated tubular wall structure, the method comprising: providing the radially inner portion: assembling the radially outer portion about the radially inner portion; and expanding the inner portion; wherein the outer portion comprises an outer tube of fibre reinforced composite construction surrounded by a flexible outer casing. There is a space between the radially inner portion and the flexible outer casing. The outer layer of fibre reinforced composite construction comprises reinforcement and a binder. The flexible outer casing serves to resist radial expansion of the reinforcement, thereby causing it to be subjected to radial compression, and the radially expanding inner portion operates in conjunction with the flexible outer casing to cause the volume of the space between the radially inner portion and the flexible outer casing to progressively decrease, thereby causing the binder within the reinforcement to spread through the space between the radially inner portion and the flexible outer casing.

The reinforcement may comprise one or more layers of reinforcing fabric. In an example, each layer is configured as a tubular layer disposed about the radially inner portion. Typically, there is a plurality of tubular layers disposed one about another and hence also disposed about the inner portion.

The reinforcing fabric may comprise reinforcing fabric which incorporates reinforcement fibres featuring quadraxial fibre orientations. The reinforcement fibres may comprise glass fibres. The quadraxial fibre orientations offer the necessary hoop and axial stress bearing properties to the tubular structure.

In an example, the binder comprises a settable plastic such as a resinous binder, which is commonly referred to as a resin. The binder sets to a resin matrix for binding the layers of reinforcing fabric together and to bind the reinforcement to the inner portion to provide the integrated tubular wall structure. The resin matrix may also bind the reinforcement to the outer casing.

In an example, the inner portion comprises an inner tube comprising an inner liner with a fibrous layer bonded onto one face thereof, wherein the resinous binder impregnating the reinforcing fabric also impregnates the fibrous layer to integrate the outer portion with the inner portion.

In an example, the outer casing comprises an outer layer and a fibrous layer bonded onto one face thereof, the arrangement being that the fibrous layer confronts the reinforcement. With this arrangement the fibrous layer of the outer casing may provide a breather layer through which air can move.

In an example, the flexible outer casing serves to resist radial expansion of the reinforcement, thereby causing it to be subjected to radial compression. With this arrangement, the reinforcement is confined in the space between the expanding inner portion and the flexible outer casing. The radially expanding inner portion operates in conjunction with the flexible outer casing to confine the reinforcement and also causes the volume of the space in which the reinforcement is confined to progressively decrease. This forces the binder within the reinforcement to fully impregnate the reinforcement; that is, the layers of reinforcing fabric become fully "wetted-out". In particular, it provides a compaction force to the reinforcement and effectively pumps the binder through the layers of reinforcing fabric to distribute the binder within the space in a controlled and constrained manner.

Further, the progressive decrease in volume of the space in which the reinforcement is confined may act to positively expel air from within the space which has the effect of enhancing impregnation of the binder within the reinforcement.

The outer casing and the various reinforcing fabric tubular layers may be adapted to facilitate the expulsion of the air. The outer casing and the various reinforcing fabric tubular layers may be configured to facilitate expulsion of air, for example, the outer casing and the various reinforcing fabric tubular layers may incorporate vents at intervals along their respective lengths to facilitate expulsion of the air. Additionally, or alternatively, the fibrous layer of the outer casing which provides the breather layer may facilitate displacement of air, typically upwardly and along the assembly to a release or venting point.

The flexible outer casing may have some resilience in order to yieldingly resist radial expansion of the reinforcing fabric tubular layers at least to some extent. However, the flexible outer casing typically has less resilience than the inner tube. In this way, the flexible outer casing can cushion the initial stage of the radial expansion of the reinforcing fabric tubular layers. In particular, the flexible outer casing has some elasticity. The flexible outer casing may have some elasticity for the purpose of enhancing control of the rate at which the binder progressively wets the reinforcement.

Another example embodiment is directed to a method of constructing an elongate hollow structure comprising a radially inner portion and a radially outer portion, with the two portions merging together to provide an integrated tubular wall structure, the method comprising: providing the radially inner portion comprising inner tube comprising an inner liner with a fibrous layer bonded onto one face thereof; assembling the radially outer portion about the radially inner portion; and expanding the inner portion; wherein the outer portion comprises an outer tube of fibre reinforced composite construction surrounded by a flexible outer casing and wherein the inner portion comprises an inner tube comprising an inner liner with a fibrous layer bonded onto one face thereof, whereby resinous binder impregnating the outer tube also impregnates the fibrous layer to integrate the outer portion with the inner portion.

Another example embodiment is directed to a method of constructing an elongate hollow structure comprising forming a flexible tubular wall structure about a central portion, expanding the central portion to cause the tubular wall structure to assume a prescribed cross-sectional profile, and hardening, curing or otherwise setting the tubular wall structure.

The central portion may comprise part of the wall structure.

The flexible wall structure may comprise a fibre-reinforced plastic composite.

The flexible wall structure may further comprise settable plastic such as a resinous binder. Typically, the settable plastic comprises a curable resin.

The fibre reinforced plastic composite may comprise reinforcement configured as a fabric incorporating reinforcement fibres.

In an example, the reinforcing fabric has quadraxial fibre orientations. The quadraxial fibre orientations offer hoop and axial stress bearing properties.

The flexible tubular wall structure may further comprise a flexible outer casing surrounding the fibre-reinforced plastic composite.

The expandable central portion may comprise an inner tube which provides an inflatable bladder to expand the flexible tubular wall structure prior to hardening, curing or other setting thereof.

In an example, the inner tube is integrated with and forms part of the tubular wall structure.

The continuous movement and then expansion of the flexible tubular wall structure serves to pre-stress and align fibres within the reinforcing fabric to enhance hoop stress bearing properties over the entire length of the elongate hollow structure under construction.

In an example, the reinforcing fabric is also pre-stressed axially (linearly) to enhance tensile load bearing properties.

The central portion may be configured as a bladder.

The bladder may be inflated using a fluid medium such as air or water.

In an example, the bladder is expandable elastically.

In one arrangement, the tubular structure may be of a specific length. The tubular structure may, for example, comprise a tubular element such as a pipe made to a specific length.

In another arrangement, the tubular structure may be formed progressively to any desired length. The tubular structure may, for example, comprise a tubular element such as a pipe formed continuously until the desired length is attained. In this regard, the pipe may be of a length to constitute a continuous pipe providing a pipeline extending between two distant locations.

In contrast to the prior art arrangement where a pipeline extending between two distant locations would typically comprise a plurality of pipe sections joined one to another, the pipe according to the first aspect of the invention can permit the pipeline to be formed as one continuous pipe.

Another example embodiment is directed to a method of constructing an elongate hollow structure comprising forming a flexible tubular wall structure having an interior, inflating the interior of the flexible tubular wall structure to provide form and shape thereto; and hardening, curing, or otherwise setting the flexible wall structure to provide the tubular element.

The flexible wall structure may comprise a fibre-reinforced plastic composite which can cure to provide the tubular element.

The flexible wall structure may further comprise a flexible outer casing surrounding the fibre-reinforced plastic composite.

In certain applications the fibre-reinforced plastic composite cures to a rigid condition. In certain other applications the fibre-reinforced plastic composite cures to a more flexible condition.

The tubular wall structure may comprise a liner having a fluid impervious inner surface. The inner surface may be defined by a high gloss material such as a polyurethane liner.

Another example embodiment is directed to a method of constructing a pipe comprising forming a flexible tubular wall structure comprising a fibre-reinforced plastic composite, inflating the interior of the flexible tubular wall structure to provide form and shape thereto; and hardening, curing or otherwise setting the flexible wall structure to provide the pipe.

The pipe may be constructed on a continuous basis and progressively installed in position prior to curing of the flexible wall structure, whereby the flexible wall structure cures once in the installed position of the pipe.

Another example embodiment is directed to a method of constructing a pipe on a continuous basis, comprising forming a flexible tubular wall structure comprising a radially inner portion and a radially outer portion, the radially inner portion comprising an inner tube, the radially outer portion comprising an outer tube of fibre-reinforced composite construction and a flexible outer casing surrounding the outer tube, inflating the inner tube to provide form and shape thereto; and curing the flexible wall structure to provide the pipe. There is a space between the inner tube and the flexible outer casing. The fibre reinforced composite construction comprises reinforcement and a binder and is located between the inner tube and the flexible outer casing. The flexible outer casing serves to resist radial expansion of the inner tube causing it to be subjected to radial compression, and the radially expanding inner tube operates in conjunction with the flexible outer casing to cause the volume of the space between the inner tube and the flexible outer casing to progressively decrease, thereby causing the binder to spread through the space between the inner tube and the flexible outer casing.

In this example method, the flexible wall structure may comprise inner and outer portions, wherein the method further comprises forming the inner portion to define an inner tube and forming an outer tube of fibre reinforced composite construction about the inner tube to define the outer portion.

The outer tube may be formed using one or more layers of reinforcing fabric, wherein the method further comprises configuring each layer as a tubular layer disposed about the inner tube, impregnating the tubular layers with a resinous binder, inflating the inner tube to provide form and shape to the tubular wall structure, and curing the resinous binder to harden the tubular wall structure.

The flexible outer casing is installed around the tubular layers of reinforcing fabric to contain the resinous binder.

The flexible outer casing may be formed of any appropriate material, including for example polyethylene.

More particularly, the outer casing comprises an outer layer of polyethylene and a fibrous layer bonded onto one face thereof, the arrangement being that the fibrous layer confronts the reinforcement, as described above.

The outer casing may remain in place and ultimately form an integral part of the tubular structure, or it may be subsequently removed after having served its purpose.

The exterior of the outer layer of the outer casing may be configured to adherence to a surrounding protective sheath, such as a concrete casing. This may comprise a surface roughness or formations such as tufts on the exterior of the outer layer of the outer casing.

The inner tube may comprise an inner liner with a fibrous layer bonded onto one face thereof, and the resinous binder impregnating the reinforcing fabric may also impregnate the fibrous layer to integrate the outer portion with the inner portion.

The pipe may be constructed in a mobile installation plant configured as a vehicle which can move in relation to an installation site such that the continuously formed pipe can be progressively delivered to the installation site.

Another example embodiment is directed to a method of constructing a pipe in a flexible condition, laying the pipe at an installation site, and allowing the flexible pipe to transform into a rigid condition at the installation site.

The installation site may comprise a trench into which the pipe is progressively laid in the flexible condition. The pipe may be laid directly into the trench or placed alongside the trench and subsequently installed in the trench. The trench may have a foundation of sand or other material shaped to provide a curved depression upon which the pipe is laid for support.

The pipe may be assembled in a mobile installation plant which can move with respect to the installation site, laying the pipe in the flexible condition.

Another example embodiment is directed to an elongate hollow structure of composite construction, comprising a radially inner portion and a radially outer portion, wherein the two portions merge together to provide an integrated tubular wall structure. The radially outer portion comprises an outer tube of fibre reinforced composite construction including reinforcement. The radially outer portion further comprises a flexible outer casing that serves to resist radial expansion of the reinforcement, thereby causing it to be subjected to radial compression. The fibre reinforced composite construction comprises the reinforcement and a binder and is located between the inner portion and flexible outer casing. The flexible outer casing serves to resist expansion of the inner portion causing the inner portion to be subjected to compression, and the binder is spread between the inner portion and flexible outer casing due to the expansion of the inner portion, operating in conjunction with the flexible outer casing to cause the volume of the space between the inner portion and the flexible outer casing to progressively decrease during the formation of the elongate hollow structure, thereby causing the binder to spread through the space between the inner portion and the flexible outer casing.

The reinforcement may comprise one or more layers of reinforcing fabric, each configured as a tube disposed about the inner portion. The reinforcement may comprise a plurality of layers, each configured as a respective tube disposed one about another.

The reinforcing fabric may comprise reinforcing fabric which incorporates reinforcement fibres featuring quadraxial fibre orientations. The reinforcement fibres may comprise glass fibres. The quadraxial fibre orientations offer the necessary hoop and axial stress bearing properties to the tubular structure.

The inner portion may comprise an inner liner with a fibrous layer bonded onto one face thereof. The other face of the liner may define the interior surface of the tubular structure.

The resinous binder impregnating the reinforcing fabric may also impregnate the fibrous layer bonded on the inner liner to integrate the outer portion with the inner portion.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 1 is a schematic view of a pipe according to a first embodiment under construction.

FIG. 2 is a schematic cross-sectional schematic view of the pipe shown in FIG. 1.

FIG. 9 is a view similar to FIG. 8, with the exception that there is shown provision for venting air from a space within the assembled tubular structure.

FIG. 10 is also a view similar to FIG. 8, with the exception that the tubular structure is shown in a collapsed (uninflated) condition.

FIG. 11 is a schematic cross-sectional view of an inner tube forming part of the assembled tubular structure, the inner tube being shown collapsed into a flattened condition.

FIG. 16 is a schematic perspective view of an assembly system for assembling the tubular layers depicted in FIG. 7.

FIG. 17 a schematic perspective view of a guide system for progressively moving a strip of reinforcing fabric as shown in FIG. 5 through a transition from the first (flat) condition to the second (tubular) condition.

FIG. 18 a schematic perspective view of a bonding system for securing overlapping edges of the strip of reinforcing fabric together to establish a joint to retain the strip in the second (tubular) condition.

FIG. 19 is a schematic view of an assembly line for the pipe and is in two parts, being FIGS. 19A and 19B.

FIG. 21 is a schematic side view of the other end section of the pipe during fabrication thereof, with an end fitting installed on that end section.

FIG. 22 is a schematic sectional view of the end section of the pipe shown in FIG. 21, together with an associated profile forming system.

FIG. 23 is a schematic view of an assembly line for a pipe according to a second embodiment and is in two parts, being FIGS. 23A and 23B.

FIG. 24 is a fragmentary view of part of the assembly line of FIG. 23.

FIG. 25 is a cross-section on line 25-25 of FIG. 23B.

FIG. 26 is a cross-section on line 26-26 of FIG. 23B.

FIG. 27 is a cross-section on line 27-27 of FIG. 23B.

FIG. 28 is a cross-section on line 28-28 of FIG. 23B.

FIG. 29 is a cross-section on line 29-29 of FIG. 23B.

FIG. 30 is a cross-section on line 30-30 of FIG. 23B.

FIG. 31 is a cross-section on line 31-31 of FIG. 23B.

FIG. 32 is a schematic view of an assembly line for a pipe according to a third embodiment.

FIG. 33 is a schematic view of part of the assembly line of FIG. 32, illustrating sets of elements for pinching the assembled tube structure and an outer casing therearound.

FIG. 34 is a fragmentary view of part of the assembly line of FIG. 32.

FIG. 35 is a cross-section on line 35-35 of FIG. 34.

FIG. 36 is a cross-section on line 36-36 of FIG. 34;

FIG. 37 is a cross-section on line 37-37 of FIG. 34.

FIG. 38 is a cross-section on line 38-38 of FIG. 34.

FIG. 39 is a cross-section on line 39-39 of FIG. 34.

FIG. 40 is a cross-section on line 40-40 of FIG. 34.

FIG. 41 is a schematic cross-sectional view of the assembled tube structure and an outer casing therearound, illustrating a condition approaching full immersion in resinous binder.

FIG. 42 is a view similar to FIG. 41 but illustrating full immersion in resinous binder.

FIG. 51 is a fragmentary side view depicting a further section of the pipe according to a sixth embodiment, the section being configured as a further bend section.

FIG. 52 is a fragmentary side view depicting the further section of the pipe shown in FIG. 51 prior to bending thereof to form the further bend section.

DETAILED DESCRIPTION

Figure 3:
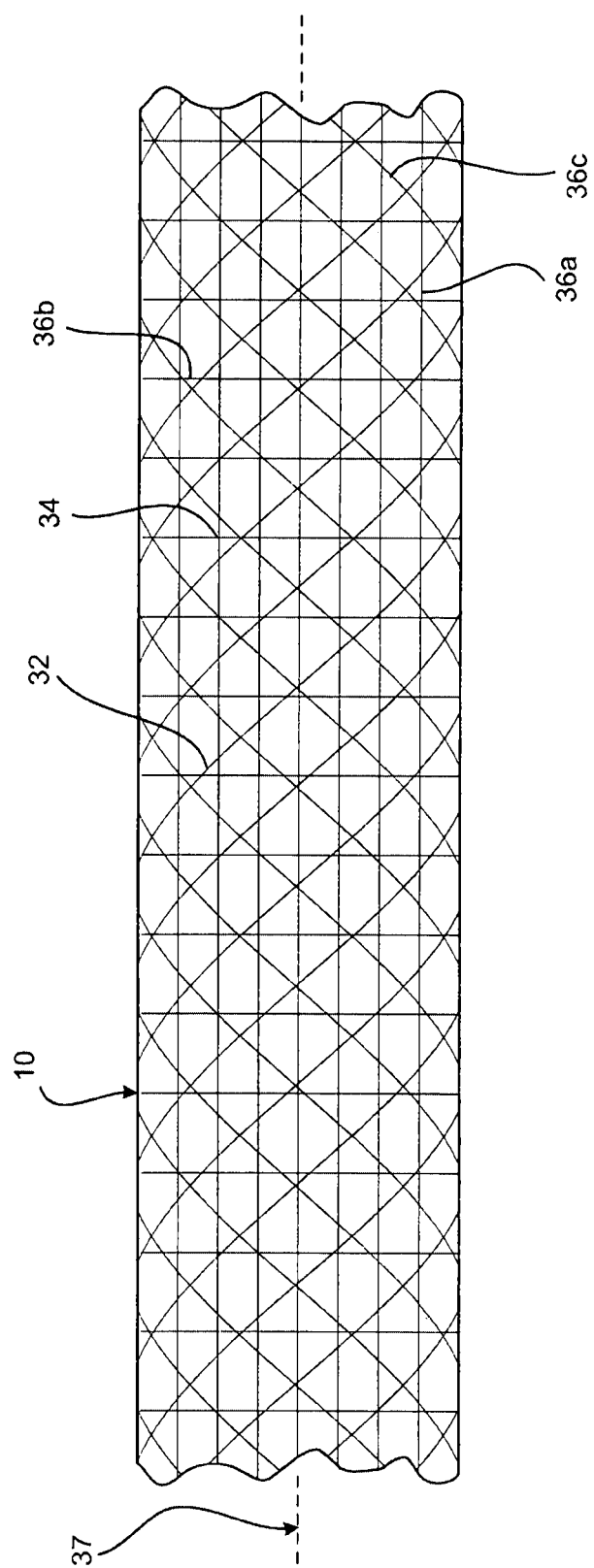
FIG. 3 is a schematic fragmentary side view of a section of the pipe.

Referring to FIGS. 1 to 22 of the drawings, a first example embodiment of the invention is directed to an elongate hollow structure in the form of a tubular element configured as a pipe 10, and to a method of construction of the pipe on a continuous basis.

The pipe 10 is of composite construction, comprising a radially inner portion 11 and a radially outer portion 13, with the two portions 11, 13 merging together to provide an integrated tubular wall structure. In the arrangement illustrated, the outer portion 13 is encased within a protective sheath 14 comprising a hardenable composition 16 such as cement or concrete contained by an outermost skin 18 of any suitable material; such as geotextile cloth. The protective sheath 14 is intended to afford protection to the pipe 10 against compression loading to which it might be exposed once in the installed condition.

The inner portion 11 comprises an inner liner 15 with a layer 17 of resin absorbent material bonded onto one face thereof. The other face of the liner 15 defines the interior surface 19 of the pipe 10. Typically, the liner 15 presents a high gloss surface at the inner face 19. The inner liner 15 may, for example, comprise polyurethane, polyethylene or any other resiliently flexible material which is preferably also impervious to air and also compatible to fluid to be conveyed within the pipe 10. The resin absorbent layer 17 may, for example, comprise felt or flock.

Figure 4:
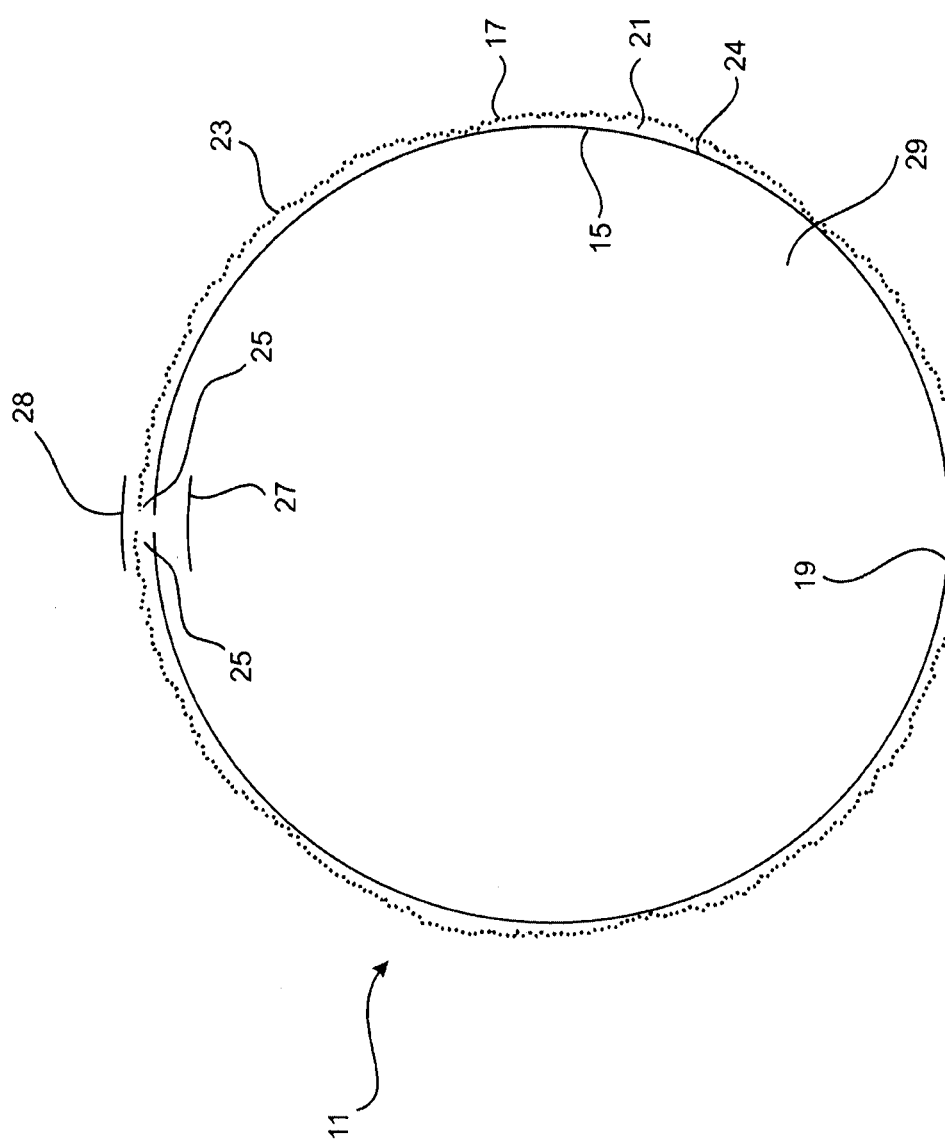
FIG. 4 is a schematic cross sectional view of the inner portion of the pipe.

As best seen in FIG. 4, the inner portion 11 is configured as an inner tube 21 formed from a longitudinal strip 23 having longitudinal side edges 25. The strip 23 is rolled longitudinally into a tubular configuration to provide the inner tube 21, with the longitudinal edges 25 in abutting relationship to provide a butt joint 26. An inner jointing strip 27 is applied to the inner side of the inner tube 21 and an outer jointing strip 28 is applied to the outer side of the inner tube 21, with the two jointing strips 27, 28 bridging the butt joint 26 and providing a continuous, fluid tight connection between the abutting longitudinal side edges 25. In FIG. 4, the jointing strips 27, 28 are shown spaced from the butt joint 26 for the purposes of clarity, but in practice are actually in contact with the butt joint.

The inner tube 21 defines an inflatable bladder 24 having an inflation cavity 29, the purpose of which will be explained later.

The outer portion 13 is configured as an outer tube 30 of fibre reinforced composite construction surrounded by a flexible outer casing 31. More particularly, the outer tube 30 comprises reinforcement 32 impregnated in a resinous binder. The flexible outer casing 31 is installed around the tube 30 to contain the resinous binder, as will be described in more detail shortly. The flexible outer casing 31 may be formed of any appropriate material, including for example polyethylene. The outer casing 31 may remain in place and ultimately form an integral part of the pipe 10, or it may be subsequently removed after having served its purpose.

The outer casing 31 comprises an outer layer of polyethylene and a fibrous layer bonded onto one face thereof, the arrangement being that the fibrous layer confronts the reinforcement 32. The fibrous layer provides a breather layer and also is ultimately impregnated with the resinous binder for integration of the assembly.

The resinous material which provides the resinous binder may be of any appropriate type; a particularly suitable resinous material comprises thermosetting resin such as epoxy vinyl ester or other suitable resin and thermoplastic resin systems.

Figure 5:
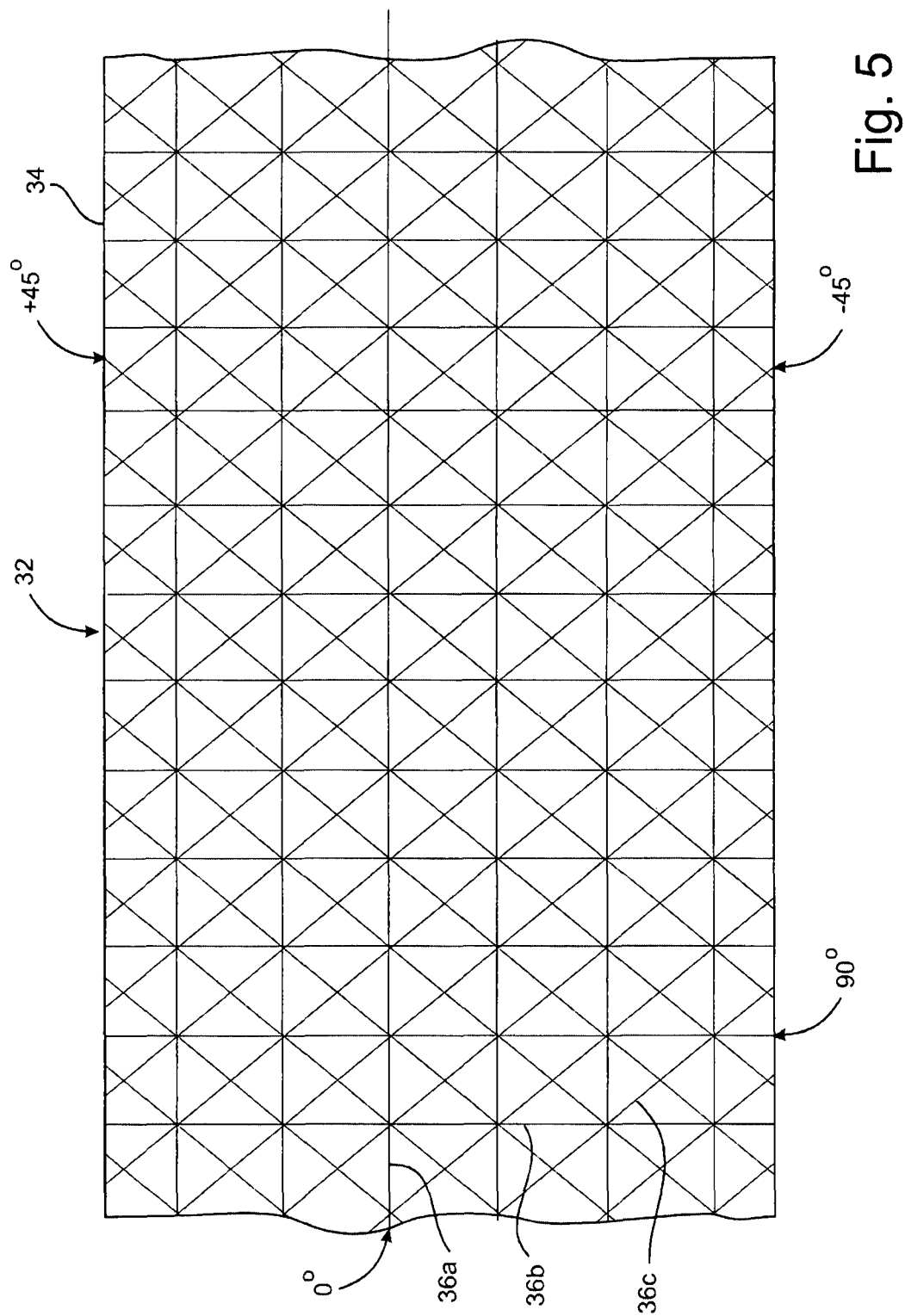
FIG. 5 is a schematic view of reinforcing fabric incorporating reinforcement fibres featuring quadraxial fibre orientations used in the construction of the outer portion of the pipe.
Figure 7:
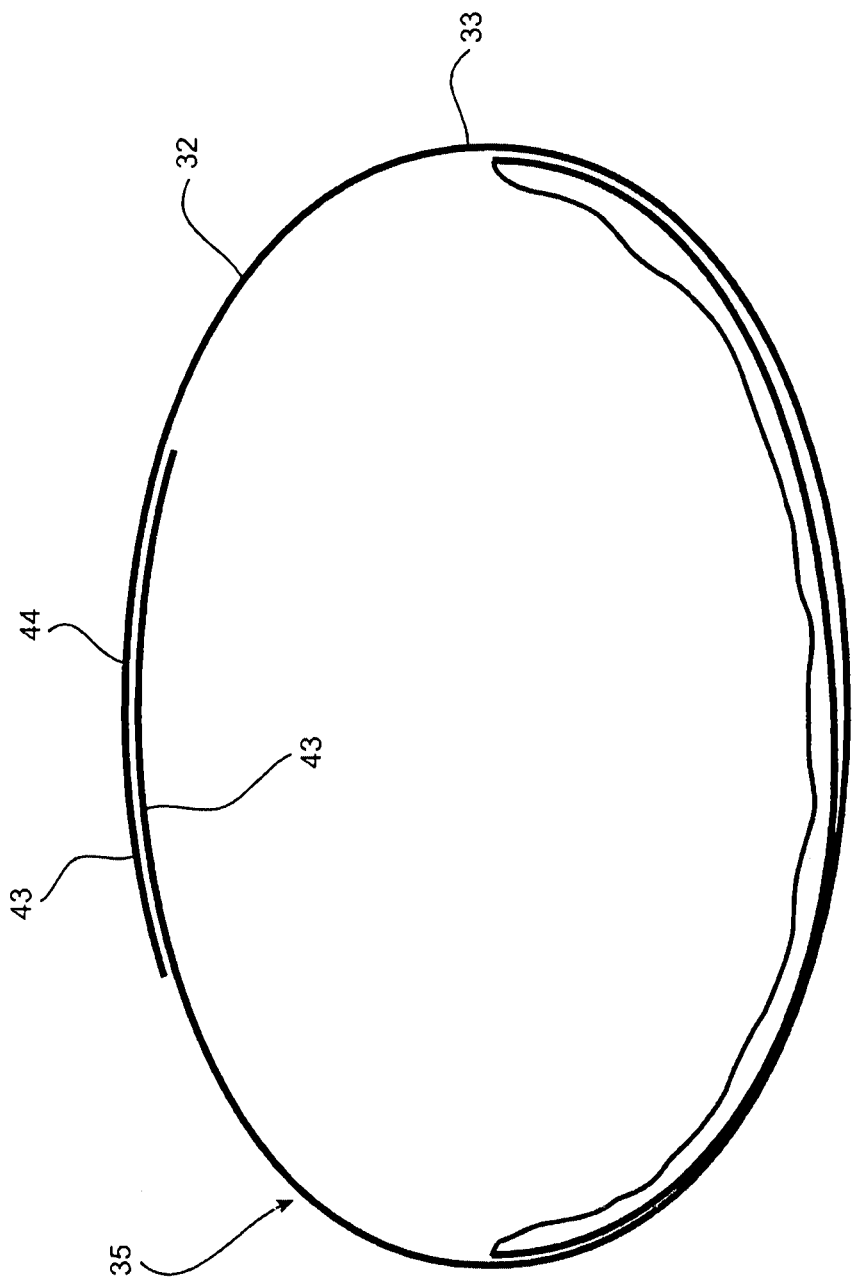
FIG. 7 is a view similar to FIG. 6, except that the tubular layer is shown in an assembled condition.
Figure 8:
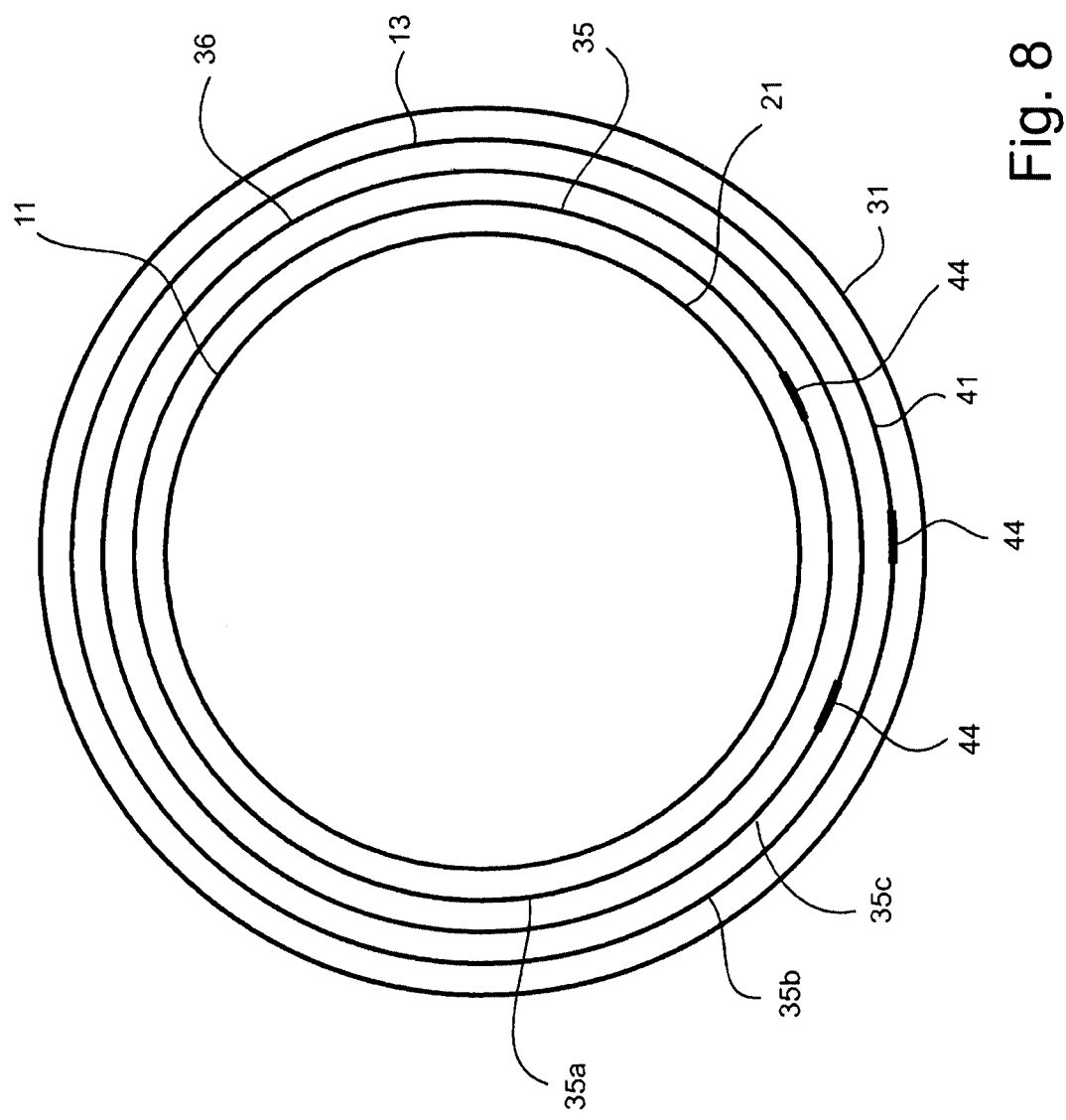
FIG. 8 is a schematic cross-sectional view of an assembled tubular structure from which the pipe according to the first embodiment is constructed, the tubular structure being shown in a radially expanded (inflated) condition.

The reinforcement 32 comprises one or more layers 33 of reinforcing fabric 34 (as shown in FIG. 5), each layer being configured as a reinforcing fabric tubular layer 35 (as shown in FIG. 7) disposed about the inner tube 21. In this embodiment, there is a plurality of layers 33 configured as the respective tubular layers 35 disposed one about another (and hence also disposed about the inner tube 21 as previously mentioned and as shown in FIG. 8). Adjacent fabric layers 33 may be bonded together in any suitable way such as by a hot welding chemical bonding, and/or mechanical fixing such as by stitching or stapling.

The reinforcing fabric 34 comprises reinforcing fabric which incorporates reinforcement fibres featuring quadraxial fibre orientations, as shown in FIG. 5. The reinforcement fibres comprise axial fibres 36a (at an angle approaching the pipe axis, which is depicted by line 37 in FIG. 3), transverse fibres 36b (at an angle approaching 90 degrees to the pipe axis) and angular fibres 36c (at an angle approaching 45 degrees to the pipe axis). The reinforcement fibres may comprise glass fibres. The quadraxial fibre orientations offer the necessary hoop and axial stress bearing properties to the pipe.

Figure 6:
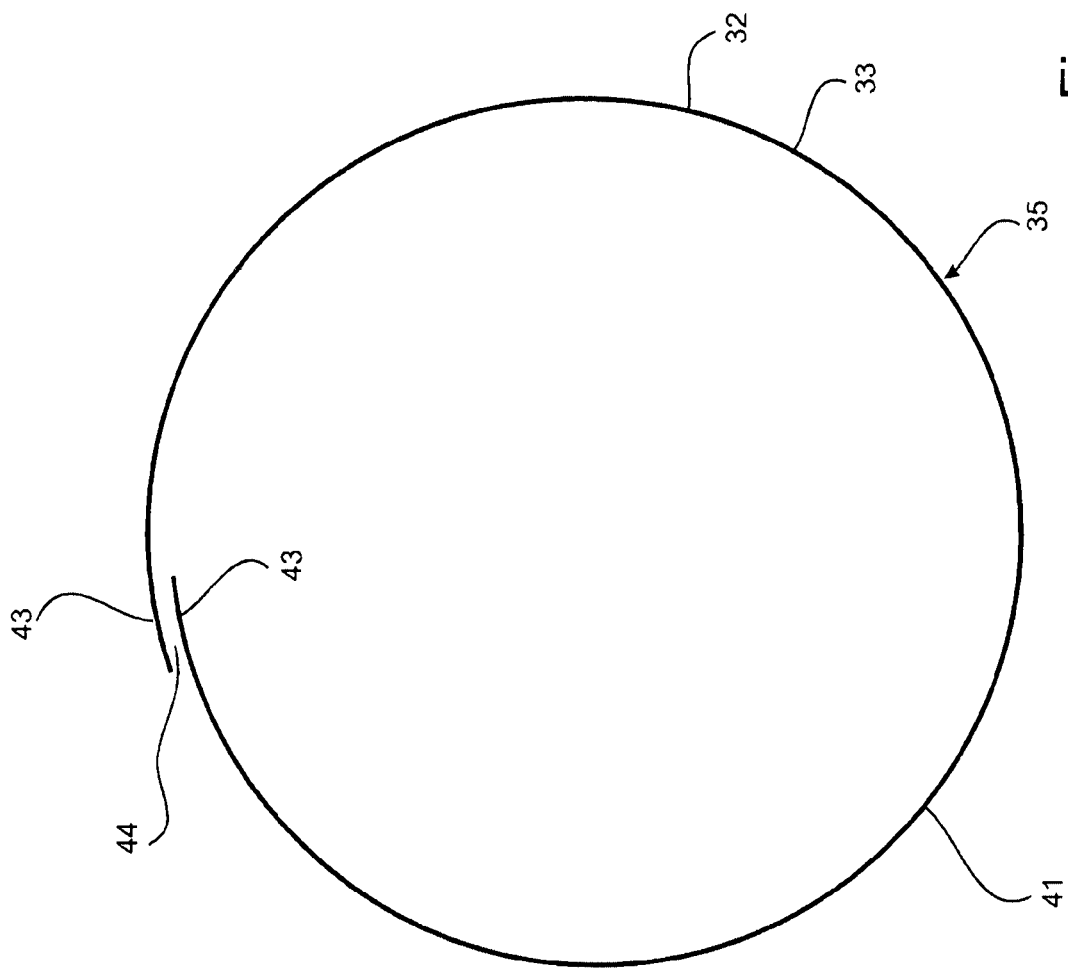
FIG. 6 is a schematic cross sectional view of a reinforcing fabric tubular layer formed from the reinforcing fabric shown in FIG. 5 and used in the construction of the outer portion of the pipe, the tubular layer being shown in a partly assembled condition

Each reinforcing fabric tubular layer 35 is assembled from a strip 41 of reinforcing fabric material having longitudinal edges 43 which are brought together in overlapping relationship at joint 44 to form the tubular layer 35. The overlapping edges 43 are secured together in any appropriate way to maintain the tubular formation. In this embodiment, the overlapping edges 43 are secured together by hot melt welding using a hot melt adhesive. In FIG. 6, the overlapping edges 43 are shown spaced apart for the purposes of clarity, but in practice are actually in contact with each other to provide the joint 44, as shown in FIG. 7. The structural integrity of the joint 44 is subsequently established by the impregnation of resinous binder into the reinforcing fabric 34 from which the respective tubular layer 35 is formed. Specifically, the resinous binder impregnates the overlapping edges 43 and bonds them together to supplement and supplant the initial bond established by the hot melt adhesive.

The various tubular layers 35 are oriented such that the respective joints 44 are offset with respect to each other, as shown in FIG. 8. In the arrangement shown in the drawings, the tubular layers 35 are oriented such that the respective joints 44 are disposed towards the underside 46 of the pipe 10 under construction. This may be advantageous as the underside 46 is the area in which resinous binder is likely to be plentiful to enhance the bond between the overlapping edges 43 at each joint 44.

The resinous binder impregnating the reinforcing fabric 34 also impregnates the layer of felt 17 on the inner liner 15 to integrate the outer portion 13 with the inner portion 11.

The reinforcing fabric tubular layers 35 are impregnated with the resinous binder after the tubular layers 35 have been disposed one about another (see for example tubular layers 35a, 35b, 35c in FIG. 8) and hence also about the inner tube 21 as previously described. In an alternative arrangement, the reinforcing fabric tubular layers 35 may be impregnated with resinous binder after each tubular layer 35 has been assembled. Each assembled reinforcing fabric tubular layer 35 may be attached to the preceding inner reinforcing fabric tubular layer 35, such as by hot melt welding. However, it may be preferable to not attach the adjacent reinforcing fabric tubular layers 35, so that each can move freely relative to the others for transfer of loads and stress whereby each layer 35 can accept its share of the load.

Typically, air is removed from the reinforcing fabric tubular layers 35 prior to impregnation with the resinous binder.

After the reinforcing fabric tubular layers 35 have been impregnated with the resinous binder, but prior to curing thereof, the inflatable bladder 24 defined by the inner tube 21 is inflated by introduction of an inflation fluid such as air into the inflation cavity 29. This causes the inflatable bladder 24 to expand radially towards the flexible outer casing 31, providing form and shape to the surrounding outer portion 13. In particular, the outer portion 13 assumes a circular profile in cross-section.

The continuous expansion of the inflation cavity 29 within the inflatable bladder 24 as it moves through a compression device 125 (see FIG. 19B) stretches the reinforcing fabric tubular layers 35 in all directions, serving to enhance hoop stress and axial stress bearing properties of the pipe 10. In particular, the expansion serves to pre-stress fibres within the reinforcing fabric tubular layers 35 to enhance hoop stress bearing properties and also axially tensions the reinforcing fabric tubular layers to pre-stress fibres therein axially to enhance tensile load bearing properties of the pipe 10.

Figure 12:
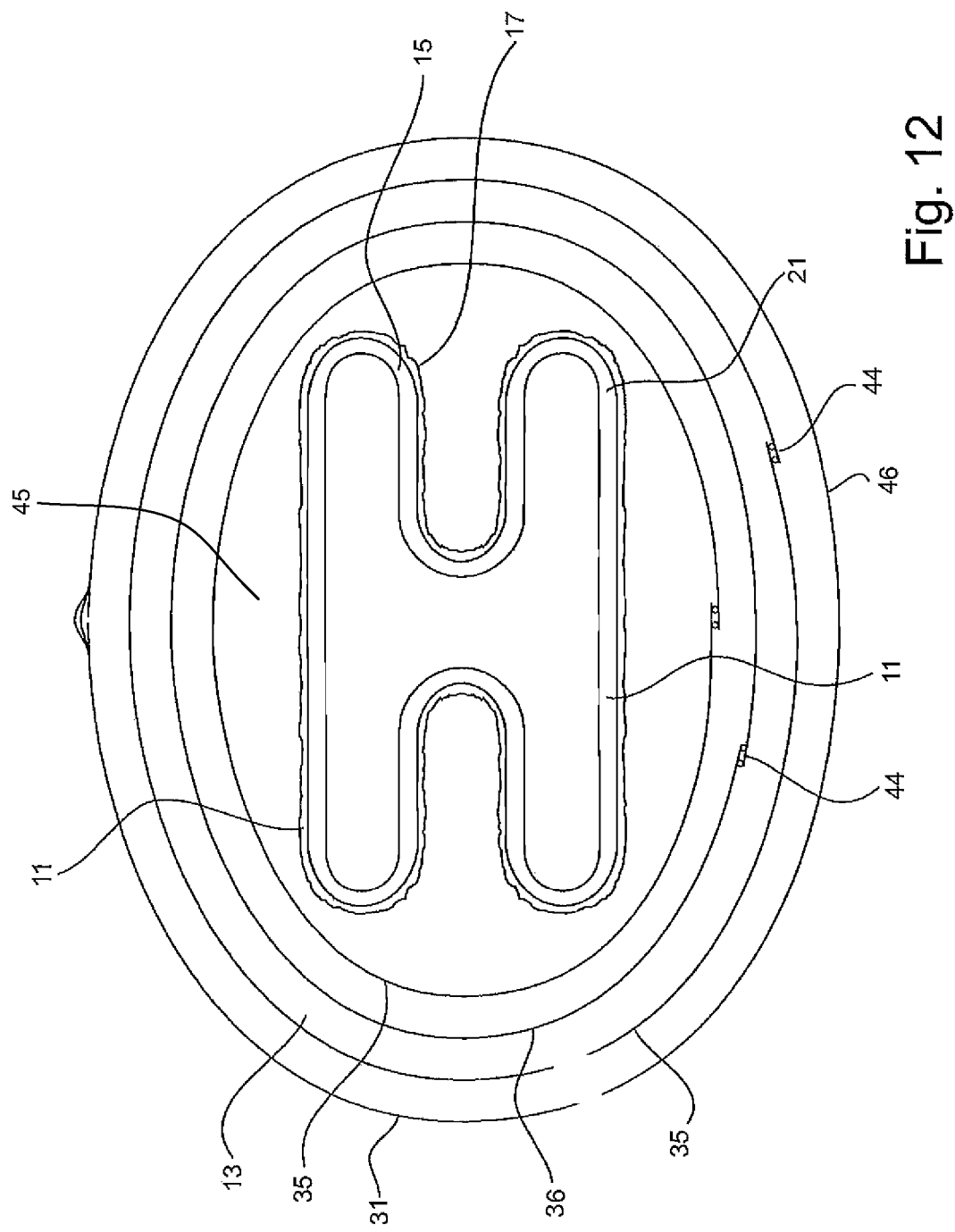
FIG. 12 is a schematic cross-sectional view of the assembled tubular structure from which the pipe according to the first embodiment is constructed, the tubular structure being shown with the inner tube being folded using a different folding pattern.

The flexible outer casing 31 serves to resist radial expansion of the reinforcing fabric tubular layers 35, thereby causing the reinforcement 32 to be subjected to radial compression. With this arrangement, the reinforcement 32 (which as previously noted comprises one or more layers 33 of reinforcing fabric 34, each layer being configured as a reinforcing fabric tubular layer 35, as shown in FIG. 12), is confined in the space 45 between the expanding inner tube 21 and the flexible outer casing 31. The radially expanding inner tube 21 operates in conjunction with the flexible outer casing 31 to confine the reinforcement 32 and also causes the volume of the space 45 in which the reinforcement 32 is confined to progressively decrease. This forces the resinous binder within the reinforcement 32 to fully impregnate the reinforcement 32; that is, the layers 33 of reinforcing fabric 34 configured as the tubular layers 35, become fully "wetted-out". In particular, it provides a compaction force to the reinforcement 32 and effectively pumps the resinous binder through the layers 33 of reinforcing fabric 34 to distribute the resinous binder within the space 45 in a controlled and constrained manner. It is a particular feature of the embodiment that the step of delivering resinous binder to the reinforcement and the step of fully wetting out the reinforcement 32 with the resinous binder are separate and distinct actions.

Further, the progressive decrease in volume of the space 45 in which the reinforcement 32 is confined acts to positively expel air from within the space 45 which has the effect of enhancing impregnation of the resinous binder within the reinforcement 32. The outer casing 31 and the various reinforcing fabric tubular layers 35 may be adapted to facilitate the expulsion of the air. The breather layer defined by the fibrous inner layer of the outer casing 31 facilitates this expulsion of air. Further, the outer casing 31 and the various reinforcing fabric tubular layers 35 may, for example, incorporate vents at intervals along their respective lengths to facilitate expulsion of the air, as shown in FIG. 9. In one arrangement, the vents 48 may comprise perforations, such as puncture holes, formed in the outer casing 31 and the various reinforcing fabric tubular layers 35. With such an arrangement, the perforations are ultimately sealed by the resinous binder to ensure the sealed integrity of the pipe 10. In another arrangement, the vents may comprise ports inserted in the outer casing 31 and the various reinforcing fabric tubular layers 35. The ports may, for example, comprise tubular inserts formed of a material which dissolves or otherwise degrades upon exposure to the resinous binder. With such an arrangement, the apertures in which the ports were accommodated are ultimately sealed by the resinous binder to ensure the sealed integrity of the pipe 10.

The flexible outer casing 31 may have some resilience in order to yieldingly resist radial expansion of the reinforcing fabric tubular layers 35 at least to some extent. In this way, the flexible outer casing 31 can cushion the initial stage of the radial expansion of the reinforcing fabric tubular layers 35. In particular, it is desirable that the flexible outer casing 31 have some elasticity. The flexible outer casing 31 may have some elasticity elastic for the purpose of enhancing control of the rate at which the progressively rising pool of resinous binder progressively wets the reinforcement 32. If, on the one hand, the resinous binder rises within the space 45 too rapidly, it may be that full wet-out of fibres in the reinforcement 32 is not achieved. If, on the other hand, the resinous binder rises within the space 45 too slowly, it may be that the resinous binder could commence to cure before full wet-out of fibres in the reinforcement 32 is achieved.

The elastic nature of the flexible outer casing 31 installed around the assembled around the reinforcement 32 functions somewhat as a girdle for controlling external pressure exerted on the rising pool of resinous binder. The elastic characteristic of the flexible outer casing 31 is selected to achieve the desired rate of wet-out. The elastic force exerted by the outer casing 31 provides some counterbalancing of the tension exerted by the inflating bladder 24 defined by the inner tube 21.

The inflatable bladder 24 is maintained in the inflated condition until such time as the resinous binder has hardened sufficiently to maintain the form and shape of the pipe, after which the inflation fluid can be released from the inflation cavity 29. The pipe 10 is thus formed, with the inner liner 15 defining the central flow passage within the pipe.

The inner tube 21 may be preformed, or may be assembled on site as part of the construction process for the pipe 10.

Figure 13:
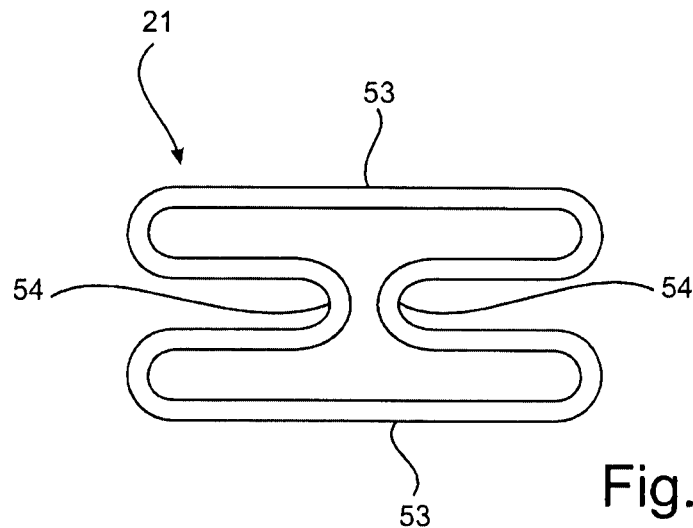
FIG. 13 is a schematic cross-sectional view of the inner tube forming part of the assembled tubular structure shown in FIG. 12, with the inner tube being shown in a folded condition.
Figure 14:
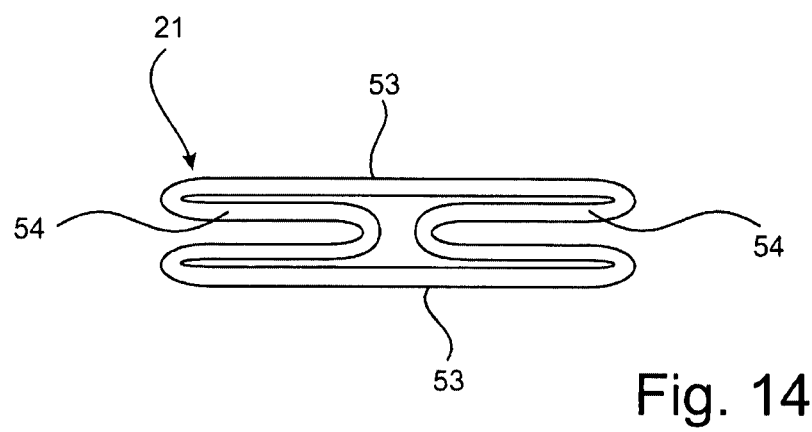
FIG. 14 is a view similar to FIG. 13, excepted that the inner tube being is shown in a partly flattened condition.
Figure 15:
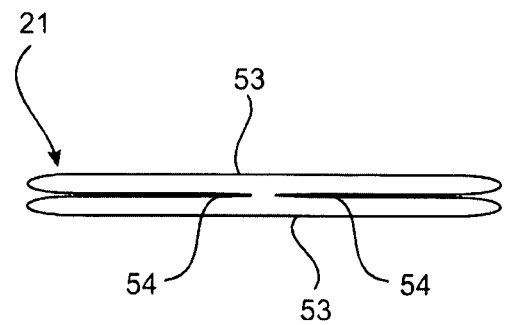
FIG. 15 is a view similar to FIG. 13, excepted that the inner tube being is shown in a fully flattened condition.

In circumstances where the inner tube 21 is preformed, it may be delivered to site in a collapsed condition. The inner tube 21 may be collapsed in any appropriate way. Typically, the inner tube 21 can assume a collapsed condition by being folded in a folding pattern to provide a compact arrangement in cross-sectional profile. In the arrangement shown in FIGS. 10 and 11, the inner tube 21 is collapsed into a flattened condition in cross-sectional profile using a folding pattern which defines two longitudinal side portions 51 and fold portions 52 therebetween. With this arrangement, the longitudinal side portions 51 can be in abutting contact with each other to provide a compact formation. In the arrangement shown in FIGS. 12 to 15, the inner tube 21 is collapsed into a flattened condition in cross-sectional profile using a folding pattern which defines two longitudinal side portions 53 and re-entrant fold portions 54 therebetween. With this arrangement, the re-entrant fold portions 54 each extend inwardly from one longitudinal side of the collapsed inner tube 21. FIG. 13 is a schematic cross-sectional view of the inner tube 21 shown in a folded condition. In FIG. 14, the inner tube 21 is shown in a partly flattened condition. In FIG. 15, the inner tube is shown in a fully flattened condition. The inner tube 21 assumes the various conditions at various stages during fabrication of the pipe 10.

The reinforcement 32 is assembled about the inner tube 21. In particular, the reinforcing fabric tubular layers 35 are assembled sequentially about the inner tube 21. As described above, each reinforcing fabric tubular layers 35 is assembled from a respective strip 41 of reinforcing fabric material having longitudinal edges 43 which are brought together in overlapping relationship at joint 44 to form the tube structure.

The various tubular layers 35 are arranged in a series 36 comprising an innermost tubular layer 35a, an outermost tubular layer 35b, and one or more intervening tubular layers 35c disposed between the innermost tubular layer 35a and the outermost tubular layer 35b. The tubular layers 35 in the series are of progressively increasing diameters in order to provide a good fit and alignment one with respect to another and thereby afford some precision in the construction of the pipe 10. In order to accommodate the progressively increasing diameters between the tubular layers 35, the respective strips 41 of reinforcing fabric material need to be of different widths, with the widths progressively increasing from the innermost tubular layer 35a to the outermost tubular layer 35b. Each tubular layer 35 is designed to be inflated, unfolded or unfurled to its maximum diameter by the inflation force of the fluid pressing against the inner tube 21 to provide the full expansion of the assembly and the fibres within it to hold the loads of the pipe 10 in operation.

As described above, the various tubular layers 35 in the series 36 are oriented such that the respective joints 44 are offset with respect to each other, as best seen in FIG. 8.

Each tubular layer 35 is assembled from its respective strip 41 by progressively moving the strip through a transition from a first condition in which the strip is flat to a second condition in which the strip is in a tubular configuration with the edges 43 in overlapping relation. In FIG. 16 of the drawings, the strip 41 is depicted with a section 41a thereof in the first (flat) condition and a further section 41b thereof in the second (tubular) condition. In the first condition, the strip 41 can be stored in roll form 55 on a reel 56, as shown in FIG. 16.

An assembly system 60 is provided for progressively moving the respective strip 41 through the transition from the first (flat) condition to the second (tubular) condition and for securing the overlapping edges 43 together to establish the joint 44 and thus form the tubular layer 35. As the strip 41 moves through the transition from the first (flat) condition to the second (tubular) condition it progressively envelopes the inner tube 21.

The assembly system 60 comprises a guide system 61 for progressively moving the respective strip 41 through the transition from the first (flat) condition to the second (tubular) condition. The guide system 61, which is best seen in FIG. 17, comprises a guide 62 comprising a body 63 defining an entry end 64, an exit end 65 and a guide path 66 extending between the entry end and the exit end. The body 63 is configured as a tubular structure 67 having longitudinal marginal edge portions 68 which are disposed in overlapping relation and spaced apart to define a longitudinal gap 69 therebetween. The tubular structure 67 is configured such that the guide path 66 tapers inwardly from the entry end 64 to the exit end 65. With this arrangement, the tubular structure 67 provides a tapering guide surface 67a which is presented to the respective strip 41 as it advances along the guide path 66 from the entry end 64 to the exit end 65 and which progressively moves the strip 41 through the transition from the first (flat) condition at the entry end 64 to the second (tubular) condition at the exit end. As the strip 41 advances along the guide surface 67a, the longitudinal marginal edges 43 of the strip are progressively turned inwardly by the tapering profile, with one of the longitudinal marginal edges 43 of the strip 41 partially entering the longitudinal gap 69 in the tubular structure 67 and the other of the longitudinal marginal edges 43 overhanging the inner marginal edge 68a. With this arrangement, the longitudinal edges 43 are progressively brought together in overlapping relationship in readiness to be secured together to establish the joint 44 and complete formation of the tubular layer 35.

As the strip 41 is being assembled into the tubular configuration to form the tubular layer 35, the inner tube 21 is also moving along the guide path 66 from the entry end 64 and the exit end 65. In this way, the tubular layer 35 can be assembled about the inner tube 21 and thereby envelopes it.

Similarly, the innermost intervening tubular layer 35c can be assembled about tubular layer 35a and the inner tube 21 about which the latter is formed, and then any other intervening tubular layers 35c and ultimately the outermost tubular layer 35b can be assembled about the preceding tubular layers 35.

The tubular structure 67 may incorporate means for attracting and holding the strip 41 against the guide surface 67a. Such means may comprise a suction system incorporating a plurality of holes in the guide surface 67a to which suction is applied to draw the strip 41 into contact with the guide surface as the strip moves along the guide path 66.

The assembly system 60 further comprises a guide roller 70 about which the respective strip 41 turns in its path from the reel 56 to the entry end 64 of the tubular structure 67 in order to align the strip 41 correctly for entry into the tubular structure 67.

The assembly system 60 further comprises a bonding system 71 for securing the overlapping edges 43 together to establish the joint 44 and thus complete formation of the tubular layer 35. The bonding system 71, which is shown in FIG. 18, comprises means 72 for applying hot melt adhesive between the overlapping edges 43 and then bringing the edges together to establish the joint 44. In the arrangement shown, such means 72 comprises a delivery head 73 for delivering one or more bands 74 of hot melt adhesive between the overlapping edges 43. The delivery head 73 is adapted to receive a supply of hot melt adhesive from a source 75 by way of a delivery line.

The bonding system 71 further comprises means 76 for bringing the overlapping edges 43 together with the hot melt adhesive therebetween to establish the joint 44. In the arrangement shown, such means 76 comprises a press 77 for pressing the overlapping edges 43 together. The press 77 comprises two cooperating press rollers 78 between which the overlapping edges 43 pass to be pressed together to establish the joint 44 by way of the hot melt adhesive. While not shown in the drawings, the assembly system 60 may further comprise means for facilitating rapid setting of the holt melt adhesives Such means may comprise an arrangement to deliver a cooling agent, such as cold air, to the area at and around the joint 44.

The construction process of the pipe 10 according to the embodiment will now be described in more detail. In this embodiment, the pipe 10 is constructed on a continuous basis and progressively laid into a trench 79 which has been dug to receive the pipe. The pipe 10 is laid in the trench 79 prior to curing of the resinous binder which impregnates the reinforcing fabric 34 and also the layer of felt 17 on the inner liner 15. The curing occurs after laying of the pipe 10 within the trench 79. In this way, the pipe 10 is in a flexible condition to facilitate it being guided into the trench and laid into position, and hardens once in position.

Referring in particular to FIG. 1, the pipe 10 is assembled in a mobile installation plant 80 configured as a vehicle which can travel alongside the trench 79 such that the continuously formed pipe 10 can "snake" from the mobile installation plant 80 into the trench 79. The pipe 10 may be cured within the trench 79 is any appropriate way. In the arrangement illustrated, a curing unit 81 is provided to progressively move along the trench 79 to expose the recently laid section of the pipe to a curing action. The curing unit 81 may, for example, apply heat or other radiation such as UV radiation or light (according to the nature of the resinous binder) to the pipe 10 to facilitate the curing process. In an alternative arrangement, the resinous binder may incorporate an appropriate catalyst to cure the pipe in ambient conditions.

The mobile installation plant 80 comprises a pipe assembly line 82, as shown in FIG. 19 (which is presented in two parts, FIGS. 19A and 19B).

Referring to FIG. 19A, the assembly line 82 comprises a supply of material 83 in strip form and stored on a roll 85. The material 83 provides the inner liner 15 with the layer of resin absorbent material 17 bonded thereto. The material 83 is progressively unwound from the roll 85 and conveyed as a strip 23 to a first assembly station 87 at which it is formed into the inner tube 21. As described previously, the strip 23 is rolled longitudinally into a tubular configuration to provide the inner tube 21, with the longitudinal edges 25 in abutting relationship to provide the butt joint 26, and the jointing strip 27 applied to the inner side of the inner tube 21 to bridge the butt joint 26 and provide a continuous, fluid tight connection.

The assembly line 82 further comprises one or more supplies of material 91, each in strip form and stored in roll form 55 on respective reels 56. In the arrangement shown in FIG. 19A there are two reels 56, but other numbers are possible. The material 91 provides the reinforcing fabric 34 incorporating reinforcement fibres featuring quadraxial fibre orientations. The material 91 is progressively unwound from the respective reel 56 and conveyed as strip 41 to a second assembly station 95 at which it is formed into the respective reinforcing fabric tubular layer 35 about the inner tube 21. As described previously, each reinforcing fabric tubular layer 35 is assembled from the strip 41 of reinforcing fabric material having longitudinal edges 43 which are brought together in overlapping relationship to form the tubular layer. The overlapping edges 43 are secured together in to maintain the tubular formation. In this embodiment, the overlapping edges 43 are secured together by hot melt welding. The respective tubular layers 35 are disposed one about another and also disposed about the inner tube 21 as previously mentioned. Adjacent fabric layers 33 may be bonded together by a hot welding or chemical bonding process. The layers may comprise a bonding or forming material to more effectively hold the layers together. This may for example comprise chop strand mat, felt or veil to enhance the laminar shear between the layers of high strength quadraxial fabric and allow for easier release of air from the laminate.

The reinforcing fabric tubular layers 35 and the inner tube 21 provide a tube structure 100. The tube structure 100 is conveyed to a third station 103 at which it is compressed between compression rollers 105 to extract air therefrom and force the resinous binder into direct contact with the reinforcement 32 and the adjacent layer 17 of resin absorbent material.

The tube structure 100 is then conveyed to a fourth station 105 at which it is impregnated with the resinous binder. In the illustrated arrangement, the tube structure 100 is passed through a resin bath 107, circulating between rollers 109 to work the resinous binder into the felt 17 and the reinforcing fabric 34. At least some of the rollers 109 are driven to assist movement of the tube structure 100.

The tube structure 100 is then conveyed to a fifth station 111 at which is engaged by doctor rollers 113 to remove excess resinous binder which can be collected in a catchment zone 115.

The tube structure 100, which is now impregnated with resinous binder, is then conveyed to a sixth station 117 at which the flexible outer casing 31 is installed to complete assembly of the tube structure 100. Referring now to FIG. 19B, the assembled tube structure 100 is then conveyed to a seventh station 121 at which there is provided the compression device 125 comprising two endless drives 127 defining a passage 129 through which the tube structure 100 can pass. The assembled tube structure 100 is compressed in the passage 129 to define a choked zone 123 blocking the passage of air along the interior of the assembled tube structure. The two endless drives 127 incorporate opposing elements 131 such as cleats which cooperate to pinch the tube structure 100 at intervals and close it against the passage of air while allowing the impregnated resinous binder within the tube structure to pass through the choke passage 129.

The compression device 125 also functions to apply traction to the assembled tube structure 100 to convey it along its path.

The section 100a of the assembled tube structure 100 beyond the compression device 125 is expanded by introduction of inflation fluid such as air into the interior thereof which defines the inflation cavity 29. This causes the assembled tube structure 100 to expand both radially and axially, providing form and shape thereto. The expansion of the assembled tube structure 100 stretches the reinforcing fabric tubular layers 35 in all directions, serving to enhance hoop stress and axial stress bearing properties of the pipe 10. In particular, the expansion serves to pre-stress fibres within the reinforcing fabric tubular layers 35 to enhance hoop stress bearing properties and also axially tensions the reinforcing fabric tubular layers 35 to pre-stress fibres therein axially to enhance tensile load bearing properties of the pipe 10.

The inflation fluid cannot escape from the inflation cavity 29 because the end is closed by the chocked zone 123 of the assembled tube structure 100 as previously explained. In other words, the compression device 125 functions as a valve to close the interior of the tubular structure 100 to prevent the escape of inflation fluid from the inflation cavity 29. Further, the compression device 125 acts as a brake to hold the expansion loads imposed by the inflation of the inner tube 21 with an inflation fluid. Still further, the compression device 125 acts as a drive to start the process before the inflation begins.

As described previously, the flexible outer casing 31 serves to resist radial expansion of the reinforcing fabric tubular layers 35, thereby causing the reinforcement 32 to be subjected to radial compression. The reinforcement 32 is confined in the space 45 between the expanding inner tube 21 and the flexible outer casing 31. The radially expanding inner tube 21 operates in conjunction with the flexible outer casing 31 to cause the volume of the space 45 in which the reinforcement 32 is confined to progressively decrease. This forces the resinous binder within the reinforcement 32 to progressively rise within the space 45 displacing the air and ultimately fully impregnate the reinforcement 32; that is, the layers 33 of reinforcing fabric 34 configured as the tubular layer 35 become fully "wetted-out". In this way, the resinous binder is forced through the layers 33 of reinforcing fabric 34 to distribute the resinous binder within the space 45 in a controlled and constrained manner.

It is a particular feature of the embodiment that the step of delivering resinous binder to the reinforcement 32, and the step of fully wetting out the reinforcement 32 with the resinous binder, are separate and distinct actions. Specifically, resinous binder is introduced into the tube structure 100 before the latter passes through the compression device 125, and the resinous binder is caused to fully wet-out the reinforcement 32 following the introduction of inflation fluid into the inflation cavity 29 after the tubular structure 100 has passed through the compression device 125.

Further, the progressive decrease in volume of the space 45 in which the reinforcement 32 is confined acts to positively expel air from within the space 45 which has the effect of enhancing impregnation of the resinous binder within the reinforcement 32, as previously described.

At this stage the resinous binder has not cured and so the section 10*a* of the pipe 10 assembled in a mobile installation plant 80 is in a flexible condition. The uncured section 10*a* of the pipe 10 leaves the mobile installation plant 80 and is guided into the trench 79, as previously mentioned. The pipe 10 may be cured within the trench 79 is any appropriate way. In the arrangement illustrated, the curing unit 81 progressively moves along the trench 79 to expose the recently laid section of the pipe to a curing action.

The assembled tube structure 100 is maintained in the inflated condition until such time as the resinous binder has hardened sufficiently to maintain the form and shape of the pipe 10, after which the inflation fluid can be released from the inflation cavity 29. The pipe 10 thus is formed, with the inner liner 15 defining the central flow passage within the pipe.

Because the tube structure 100 is assembled progressively as described, it can be considered to have a commencement end 133 and a terminal end 135. Typically, the inflation fluid such as air for the inner tube 21 is introduced through the commencement end 133 of the tube structure 100.

Figure 20:
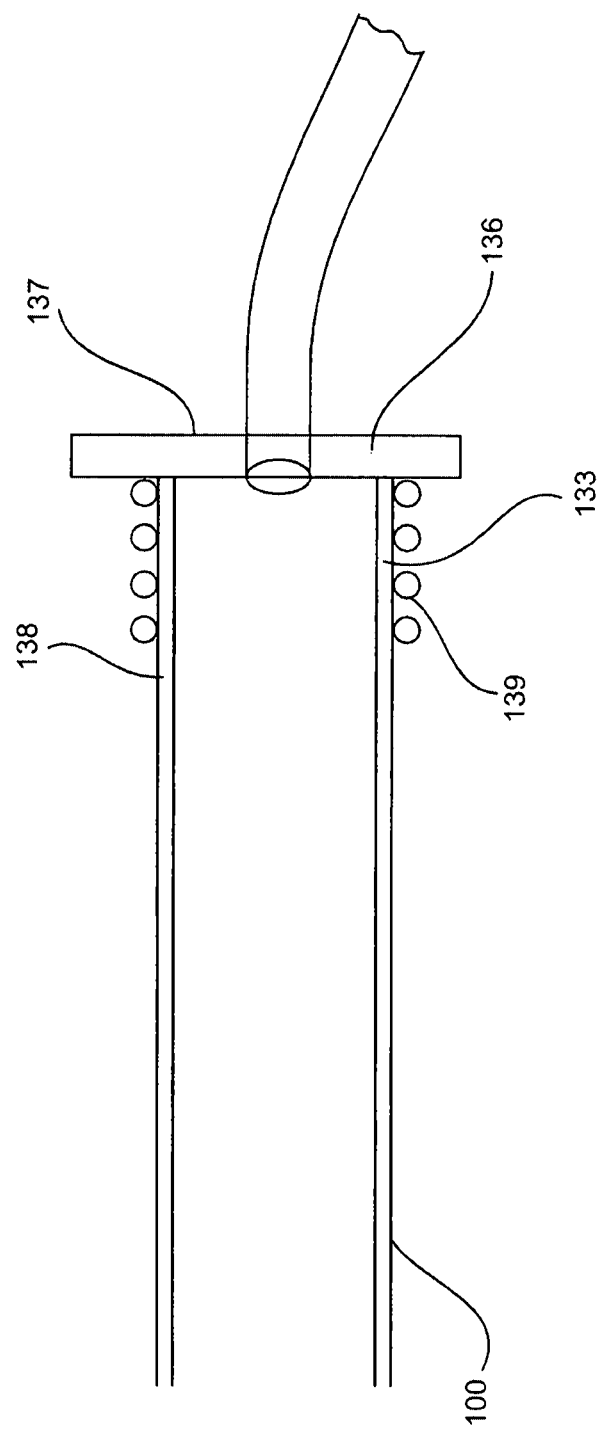
FIG. 20 is a schematic sectional view of one end section of the pipe during fabrication thereof, with an end fitting installed on that end section.
Figure 43:
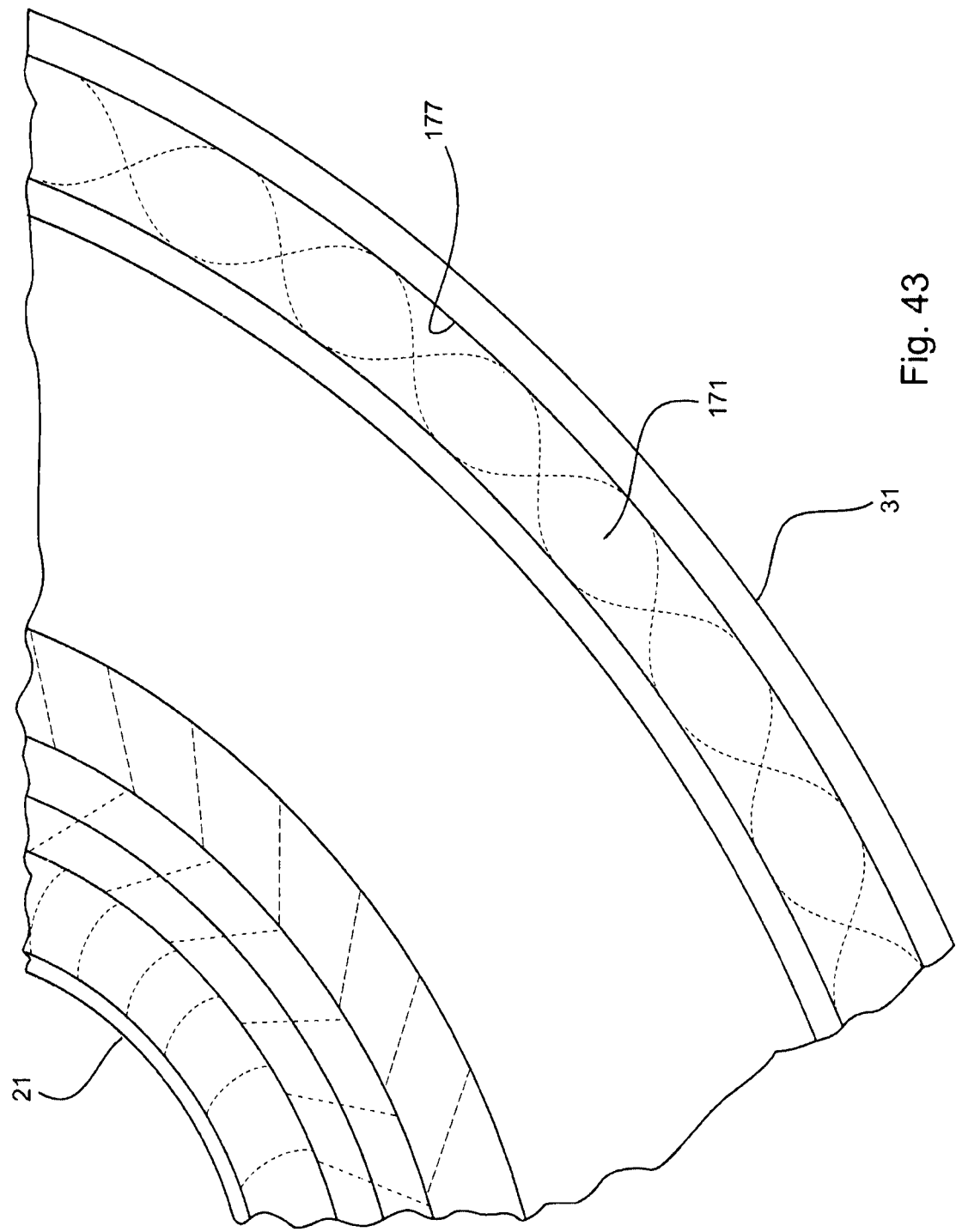
FIG. 43 is a fragmentary cross-sectional view of the arrangement depicted in FIG. 39.

The commencement end 133 is shown in FIG. 20. In the arrangement shown, the commencement end 133 is fitted with an end fitting 136 which comprises an end flange portion 137 and a spigot portion 138. The end fitting 136 is installed onto the commencement end 133 immediately after it has emerged from the compression device 125. The installation procedure involves insertion of the spigot portion 138 into the end of the tube structure 100 and then clamping the commencement end 133 of to the spigot portion, typically by clamping means 139 such as straps or clamping rings. A collar (not shown) may be installed onto the commencement end 133 to give it form and shape to receive the spigot portion 138 of the end fitting 136.

The flange portion 137 has provision 141 for communication with a fluid line 142 for delivery of inflation fluid into the inner tube 21. In the arrangement shown, the provision 152 includes a port 143 through which the delivery end section of the fluid line 142 extends.

The terminal end 135 is shown in FIGS. 21 and 22. In the arrangement shown, the terminal end 135 is fitted with an end fitting 144 which closes the end. The end fitting 144 comprises a clamp 145 adapted to clampingly engage the tubular structure to sealingly close the terminal end 135. The clamp 145 is adapted to be fitted onto the tubular structure 100 after the latter has been assembled but prior to it passing through the compression device 125. The clamp 145 is adapted to pass along the passage 129 between the two endless drives 127 without interfering with the operation of the opposing elements 131 which cooperate to pinch the tube structure 100 at intervals along the passage 129. The arrangement is such that the clamp 145 moves in timed relation with the two endless drives 127 so that the position of the clamp 145 along the passageway does not at any stage coincide with a point at which the tube structure 100 is being pinched closed by cooperating opposing elements 131 of the two endless drives 127. In this way, the clamp 145 can pass along the passage 129 while attached to the tube structure 100 without interfering with the operation of the opposing elements 131.

In circumstances there may be a requirement for the end section of the tube structure 100 adjacent to the terminal end 135 to be of a specific cross-sectional profile. In such circumstances, a profile forming system 146 may be utilised, as shown in FIG. 22. The profile forming system 146 comprises an external die 147 corresponding to the desired profile, the arrangement being that the end section of the tubular structure 100 adjacent to the terminal end 135 passes through the die 147 after having exited the compression device 125. Internal pressure may be applied to the end section of the tube structure 100 adjacent to the terminal end 135 in order to urge the end section outwardly into contact with the die 147 so that the desired profile can be applied to the end section. In the arrangement shown, the internal pressure is applied by way of an inflation assembly comprising inflatable bladder 148 and an associated flexible fluid delivery line 149 along which an inflation fluid can be delivered to inflate the bladder 148. The inflatable bladder 148 is adapted to be inserted into the end section of the tubular structure 100 adjacent to the terminal end 135 prior to attachment of the clamp 145 to the terminal end 135. The fluid delivery line 149 extends to the exterior of the tube structure 100, passing through a hole formed for the purpose in the tube structure 100. The inflatable bladder 148 is inserted into the end section of the tube structure 100 in a deflated condition and passed through the compression device 125 in the deflated condition along with the flexible fluid delivery line 149. The bladder 148 is inflated once the terminal end 135 has exited the compression device 125 but prior to the end section of the tube structure 100 adjacent to the terminal end 135 being engaged by the die 147. Inflation of the bladder 148 applies internal pressure to the end section of the tube structure 100 adjacent to the terminal end 135, thereby urging the end section outwardly into contact with the die 147 so that the desired profile can be applied to the end section.

It is a particular feature of the embodiment that the step of delivering resinous binder to the reinforcement 32 and the step of fully wetting out the reinforcement 32 with the resinous binder are separate and distinct actions. Specifically, the resinous binder is delivered to the reinforcement 32 prior to passage of the tube structure 100 through the compression device 125. The inner tube 21 is inflated after the tube structure 100 has passed through the compression device 125.

Referring now to FIG. 23 (which is presented in two parts, FIGS. 23A and 23B), there is shown a pipe assembly line 150 for a pipe according to a second example embodiment. The pipe assembly line 150 is similar in some respects to the pipe assembly line 82 used for the first embodiment and corresponding reference numerals are used to identify corresponding parts.

The second embodiment does not use a resin bath (as was the case in the first embodiment) for impregnating the tube structure 100 with the resinous binder. Rather, resinous binder is delivered to the assembled tube structure 100.

Referring to FIG. 23A, a flexible outer casing 31 is installed around the assembled portion of the outer tube structure 100 to contain the resin binder, as will be described in more detail shortly. The outer casing 31 may be formed of any appropriate material, including for example polyethylene. The outer casing 151 may remain in place and ultimately form an integral part of the pipe, or it may be subsequently removed after having served its purpose. The material 153 from which the outer casing 31 is assembled is in strip form and stored on roll 155. The material 153 is progressively unwound from the roll 155 and conveyed as a strip 156 to station 157 at which it is assembled into a tube 159 which provides the outer casing 31. The tube 159 is assembled from the strip 156 by bring the longitudinal edges of the strip together in overlapping relationship to form the tube. The overlapping edges are secured together to maintain the tubular formation by any appropriate means such as stitching, welding or stapling.

Resinous binder is delivered into the flexible outer casing 31 through open end 161 thereof. The resinous binder is delivered along delivery line 163 which extends into the flexible outer casing 31 through the open end 161 and has an outlet end 162 disposed inwardly of the open end 161. The delivery line 163 receives the resin from a reservoir 165 such as a supply tank. A pump 167 is provided for pumping the resin along the delivery line 163 from the reservoirs 165 to the outlet end 162. Resinous binder is delivered into the flexible outer casing 31 tends to a pool 171 at the bottom of the tube 159 which provides the outer casing 31.

The assembled tube structure 100 is compressed to define the choked zone 123 by the compression device 125 comprising the two endless drives 127. The opposing elements 131 (such as cleats) on the two endless drives 127 cooperate to pinch the tube structure 100 and close it against the passage of air while allowing the impregnated resinous binder confined within the flexible outer casing 31 to pass through the choke passage 129. The action of the cooperating elements 131 serves to pinch the assembled tube structure 100, together with the outer casing 31, at intervals. This causes the resinous binder, which is contained in the outer casing 31 and which is pooling at the bottom thereof, to collect in "puddles" in the sections of the outer casing 31 between each set of cooperating elements 131, as shown in FIG. 24.

As the assembled tube structure 100 progressively moves beyond the compression passage 129 defined by the device 125, the pool 171 of resinous binder progressively rises in the annular space 45 between the inner liner 21 and the surrounding flexible outer casing 31. This occurs because the expanding inner tube 21 progressively reduces the cross-sectional size of the annular space 45, thereby causing the level of the pool 171 of resinous binder to progressively rise. This is depicted schematically in FIG. 23B and FIGS. 25 to 29 in which the surface of the pool 171 is identified by reference numeral 177. The rising pool 171 of resinous binder within the annular space 45 progressively displaces air within the annular space. The outer casing 31 is constructed to facilitate the displacement of the air. This may involve provision of slow release air valves within the outer casing 31 at intervals along its length and non woven breather materials as part of the outer casing to facilitate air release from the pipe and along the length of the pipe. Additionally, or alternatively, vacuum points may be provided along the length of the tubular structure 100.

The surface 177 of the progressively rising pool 171 forms a wave profile as depicted by line 179 in FIG. 23B.

The progressively rising pool 171 of resinous binder progressively wets the reinforcement 32 and the adjacent resin absorbent layer 17 of the inner liner 21. Ultimately, the assembled tube structure 100 is fully impregnated with resinous binder.

Referring now to FIGS. 32 to 43 there is shown part of a pipe assembly line 200 for a pipe according to a third example embodiment. The pipe assembly line 200 is similar in some respects to the pipe assembly line 150 used for the second embodiment and corresponding reference numerals are used to identify corresponding parts.

The pipe assembly line 150 used for the second embodiment employed a flexible outer casing 31 installed around the assembled outer tube structure 100 to contain the resin binder and establish the progressively rising pool 171 of resinous binder for progressively wetting the assembled tube structure 100.

The pipe assembly line 200 used for the third embodiment also employs an flexible outer casing 31 to contain the resin binder within the assembled outer tube structure 100 and establish the progressively rising pool 171 of resinous binder.

In this third embodiment, the flexible outer casing 31 is elastic for the purpose of enhancing control of the rate at which the progressively rising pool 171 of resinous binder progressively wets the assembled tube structure 100. If, on the one hand, the pool 171 of resinous binder rises within the annular space 45 too rapidly, it may be that full wet-out of fibres in the assembled tube structure 100 is not achieved. If, on the other hand, the pool 171 of resinous binder rises within the annular space 45 too slowly, it may be that the resinous binder could commence to cure before full wet-out of fibres in the assembled tube structure 100 is achieved.

The elastic nature of the flexible outer casing 31 functions somewhat as a girdle for controlling external pressure exerted on the rising pool 171 of resinous binder. The elastic characteristic of the flexible outer casing 31 is selected to achieve the desired rate of wet-out. The elastic force exerted by the outer casing 31 provides some counterbalancing of the tension exerted by the inflating inner tube 21.

In this embodiment, the tube structure 100 is compressed prior to installation of the elastically flexible outer casing 31 to complete assembly of the tube structure. In the arrangement shown, the compression of the tube structure 100 is achieved by passing it through a constriction 180 which is configured as a funnel.

Figure 44:
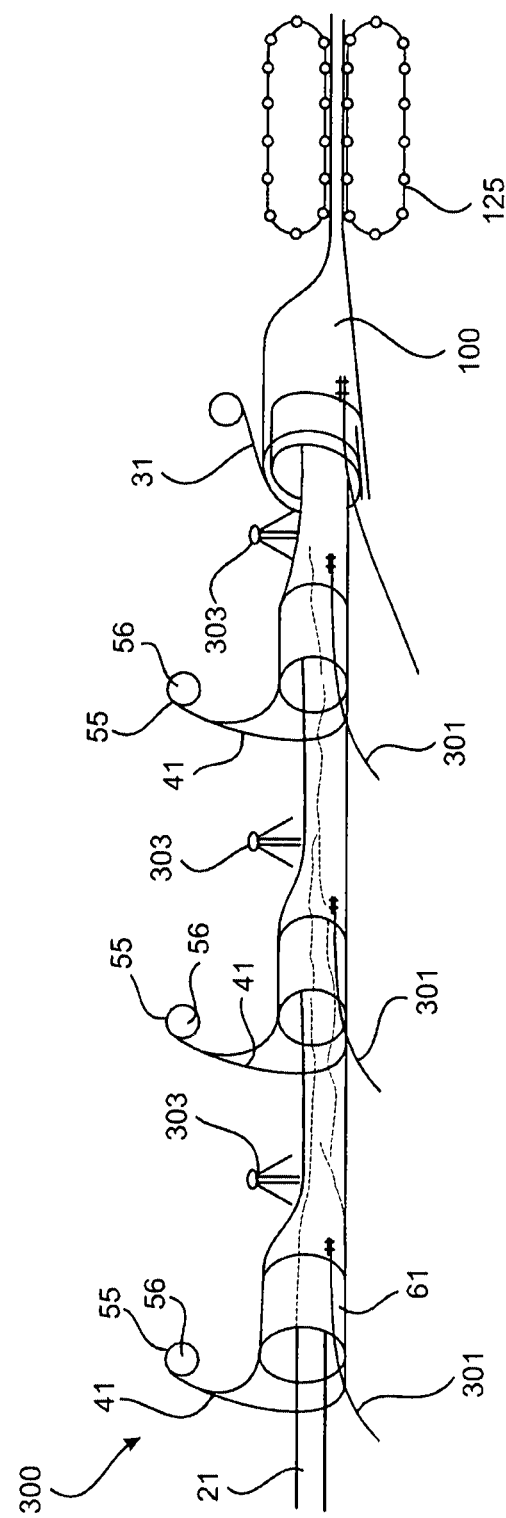
FIG. 44 is a schematic view of part of an assembly line for a pipe according to a fourth embodiment.

Referring now to FIG. 44, there is shown part of a pipe assembly line 300 for a pipe according to a fourth example embodiment. The pipe assembly line 300 is similar in some respects to the pipe assembly line 82 used for the first embodiment and corresponding reference numerals are used to identify corresponding parts.

In this fourth embodiment, resinous binder is delivered to the various tubular layers 35 forming the reinforcement 32 during assembly of the tube structure 100, rather than using a resin bath as was the case in the first embodiment. The tube structure 100 is progressively assembled by forming the reinforcing fabric tubular layers 35 about the inner tube 21, with each tubular layer 35 being formed from respective strip 41 within the respective assembly system 60, as shown in FIG. 44. As each reinforcing fabric tubular layer 35 is assembled, a quantity of resinous binder is deposited into the interior of the tubular layer. Further, resinous binder may be sprayed, rolled or otherwise deposited onto the exterior of each tubular layer 35 after assembly thereof. In the arrangement shown in FIG. 44, there is provided a delivery system 301 for depositing a slug of resinous binder into the interior of each tubular layer 35 as the respective strip 41 from which the tubular layers is formed moves through the transition from the first (flat) condition to the second (tubular) condition. In the arrangement shown in FIG. 44, there is further provided a spray roller or other system 303 for spraying resinous binder onto the exterior of each tubular layer 35 after assembly thereof and prior to installation of the next tubular layer 35 therearound. With this arrangement, resinous binder is applied to the reinforcement 32 to fill most of the available volume while still allowing for movement of the resinous binder through the various tubular layers 35 to displace air from the lower region of the space 45 between the expanding inner tube 21 and the flexible outer casing 31 to the upper region of the space 45 for subsequent venting.

In certain applications, there may be a need to facilitate a relatively rapid wet-out of the reinforcement 32 and the adjacent resin absorbent layer 17 of the inner liner 21, rather than relying solely on progressively rising pool of resinous binder as described in previous embodiments. Such an application may, for example, relate to a pipeline installation in which the tube structure 100 has an inclined section in which the resinous binder would migrate downwardly under the influence of gravity and not achieve a satisfactory wet-out the reinforcement 32 and the adjacent resin absorbent layer 17 of the inner liner 21.

Figure 45:
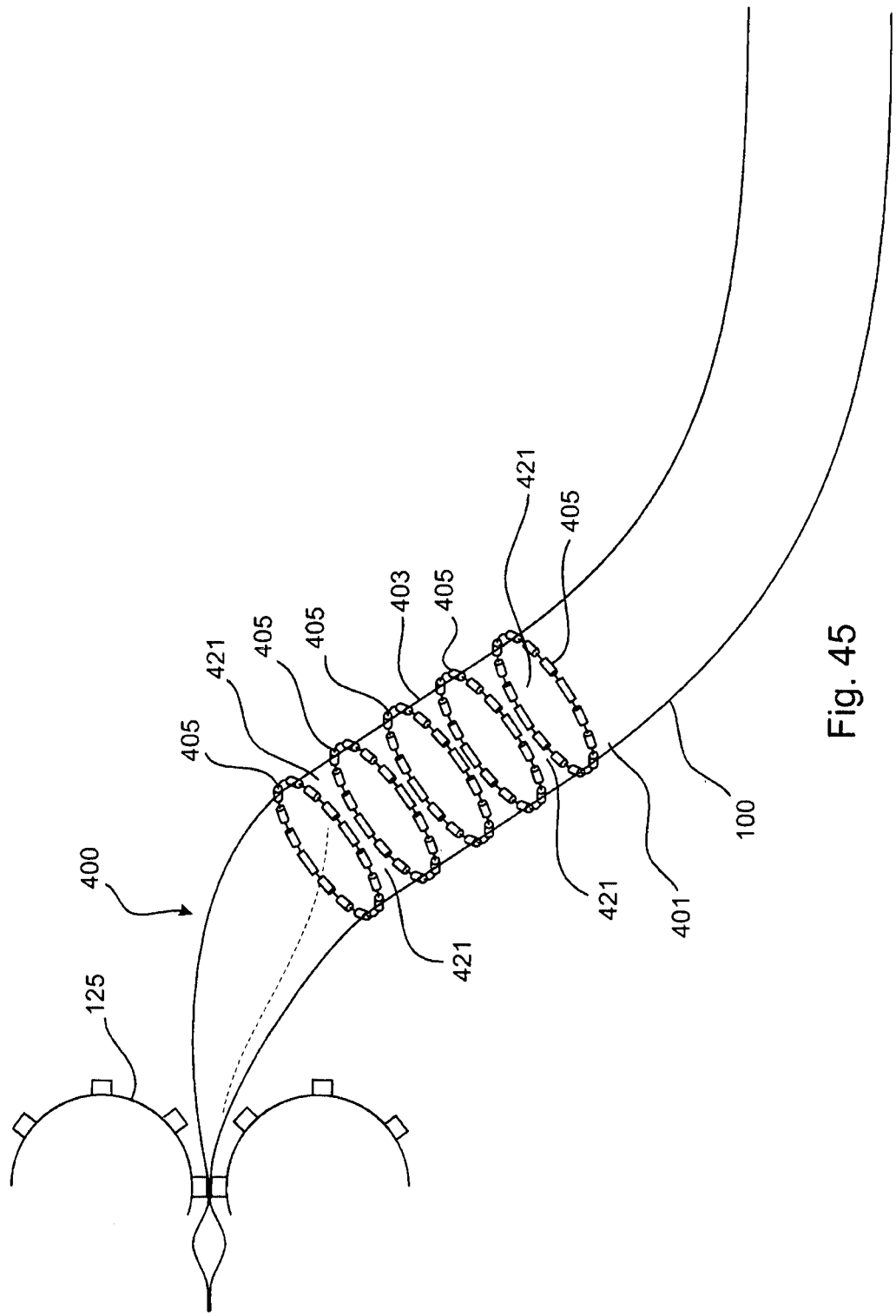
FIG. 45 is a schematic view of part of an assembly line for a pipe according to a fifth embodiment.
Figure 46:
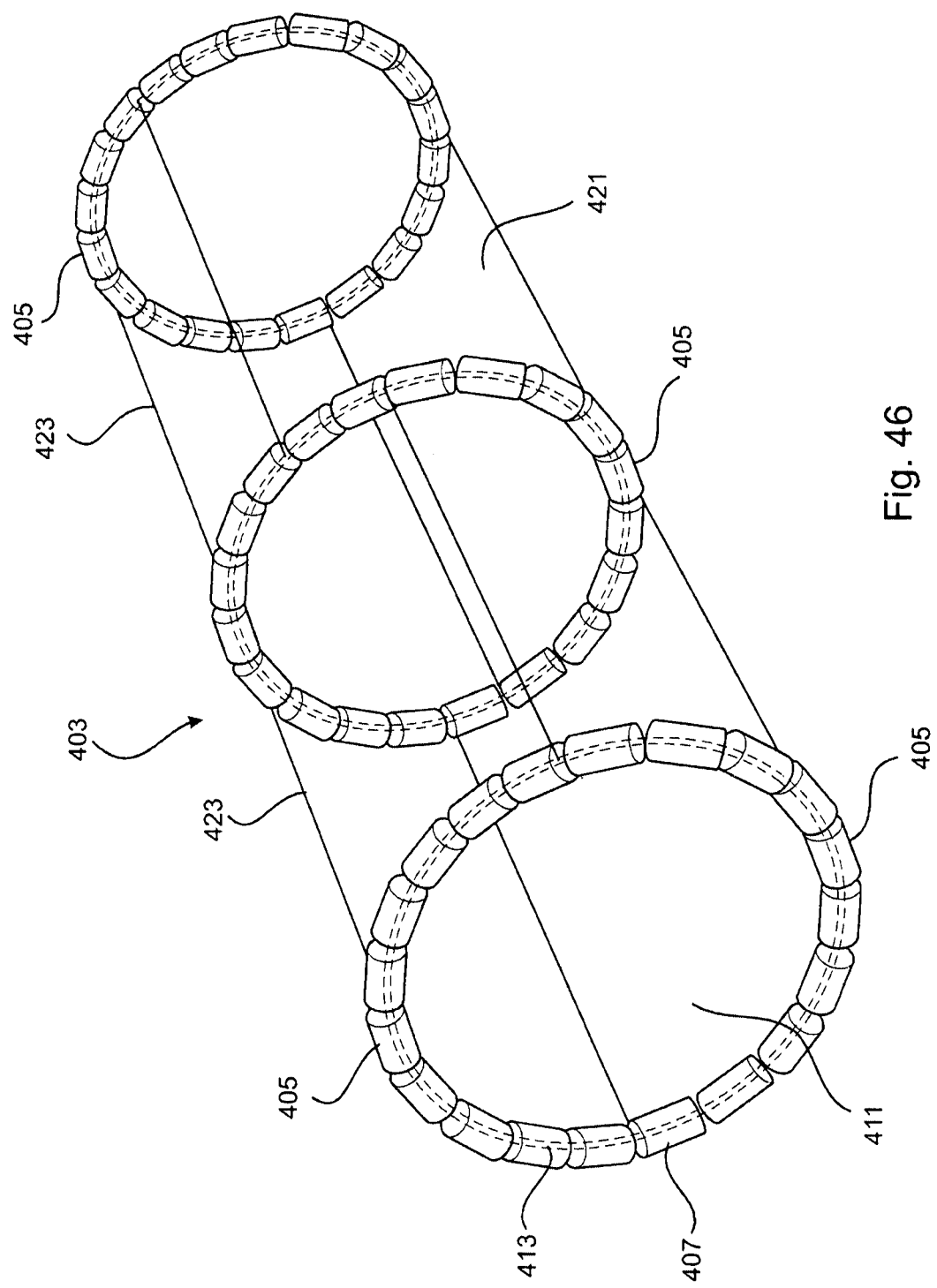
FIG. 46 is a schematic perspective view of apparatus used in the assembly line shown in FIG. 45, the apparatus being provided to facilitate a relatively rapid wet-out of the reinforcement used in fabrication of the pipe.
Figure 47:
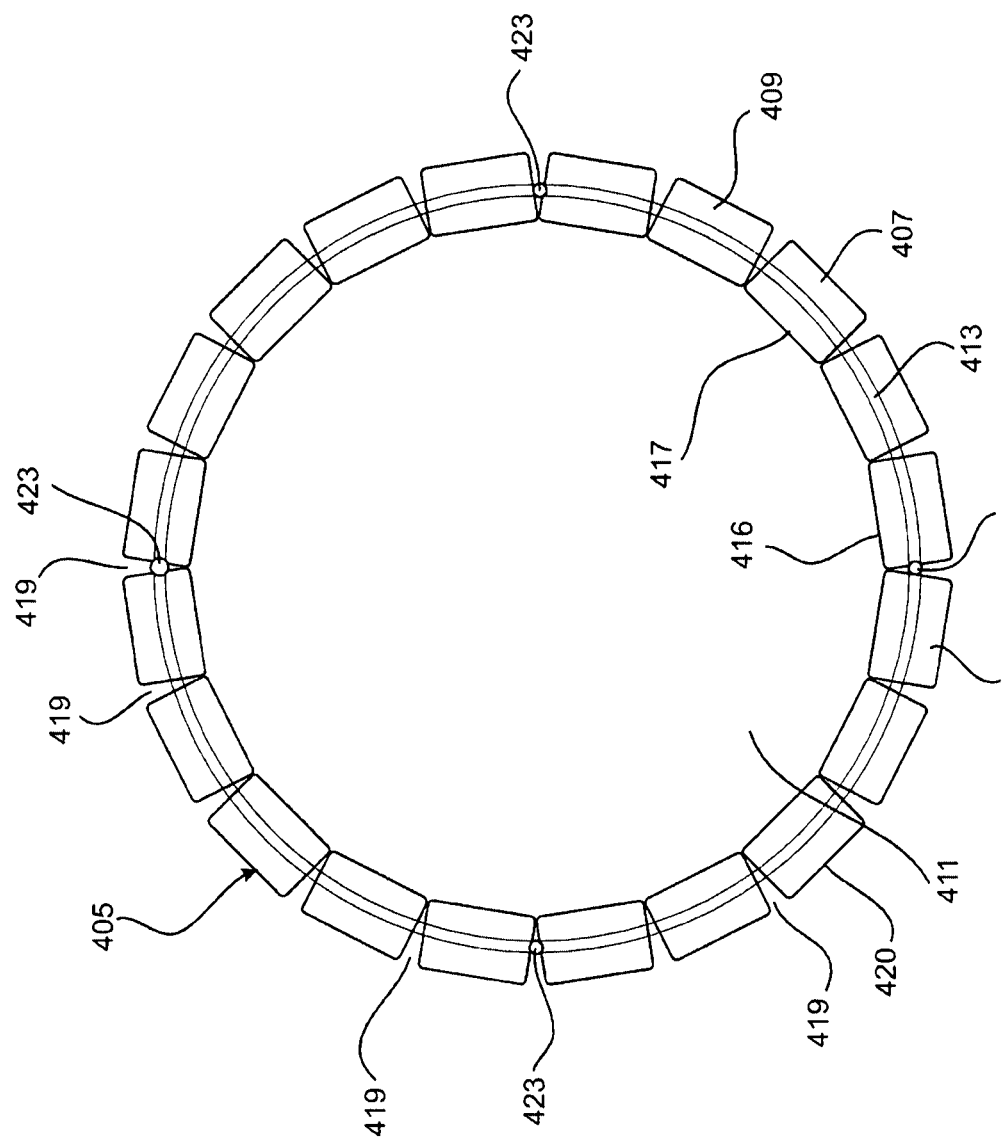
FIG. 47 is an elevational view of a roller array used in the apparatus shown in FIG. 46.

Referring now to FIGS. 45, 46 and 47, there is shown part of a pipe assembly line 400 for a pipe according to a fifth embodiment. The pipe assembly line 400 is similar in some respects to the pipe assembly line 82 used for the first embodiment and corresponding reference numerals are used to identify corresponding parts.

In the arrangement shown the tube structure 100 has a section 401 thereof which is steeply inclined to an extent that the resinous binder would migrate downwardly under the influence of gravity and not achieve a satisfactory wet-out of the reinforcement 32 and the adjacent resin absorbent layer 17 of the inner liner 21.

The pipe assembly line 400 incorporates apparatus 403 to facilitate a relatively rapid wet-out of the reinforcement 32 and the adjacent resin absorbent layer 17 of the inner liner 21.

The apparatus 403 comprises a plurality of roller arrays 405 disposed in spaced apart relation. Each roller array 405 comprises a plurality of rollers 407 arranged in an annular formation 409 defining a central circular space 411 through which the assembled tube structure 100 can pass in a constricted condition.

Each roller array 405 comprises a central axle 413 configured as a ring upon which the respective rollers 407 are rotatably mounted. The rollers 407 are disposed angularly one with respect to another because of the ring configuration of the central axle 413. The rollers 407 are also located close together. Because of the angular disposition and close positioning of the rollers 407, the cylindrical rolling surfaces 415 of the rollers 407 cooperate at the inner side 416 of the annular roller array 405 to present a rolling contact surface 417. Additionally, gaps 419 are formed between adjacent rollers 407 at the outer side 420 of the annular array 405.

The roller arrays 405 are spaced axially one with respect to another, with spaces 421 defined between each two adjacent roller arrays.

The rings 415 are connected one to another to maintain the roller arrays 405 in position. In the arrangement shown, the axles 413 are connected together by connecting rods 423. The presence of the gaps 419 between adjacent rollers 407 at the outer side 420 of the annular roller array 405 provides access for attachment of the connecting rods 423 to the axles 413.

The apparatus 403 is adapted to be progressively moved along the assembled tube structure 100 once the inner tube 21 has been inflated. In the arrangement shown in FIG. 45, the apparatus 403 is positioned closely behind the compression device 125.

Typically, the apparatus 403 is pulled along the assembling tube structure 100 closely behind the compression device 125.

The apparatus 403 may also be adapted to impart vibration to the tube structure 100 to excite the resinous binder and enhance the wetting process.

Figure 48:
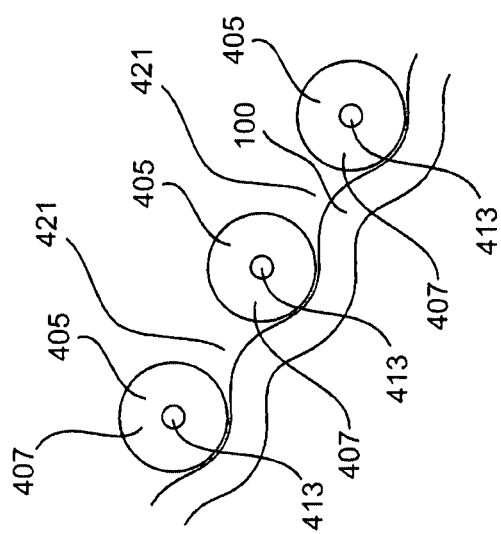
FIG. 48 is a fragmentary schematic view depicting a tubular structure assembled during fabrication of the pipe being subjected to manipulation akin to a peristaltic pressing action by the apparatus shown in FIG. 46.

With this arrangement, the tube structure 100 is subjected to manipulation akin to a peristaltic pressing action when passing through the apparatus 403, as depicted schematically in FIG. 48. Specifically, the tube structure 100 is constricted when passing through each central circular space 411 and then expands into the intervening spaces 419 under the influence of the inflation pressure within the inner tube 21. This successive constriction and expansion manipulates the assembled tube structure 100 to distribute the resinous binder and facilitate relatively rapid wet-out of the reinforcement 32 and the adjacent resin absorbent layer 17 of the inner liner 21.

The preceding example embodiments have been described with reference to construction of the pipe 10 which is progressively laid into a trench dug to receive the pipe.

The example embodiments of the present invention, including the pipe according to various embodiments which have been described and illustrated, is not limited a pipe which is and progressively laid into a trench dug to receive the pipe.

The pipe may be adapted to be laid on the ground, either directly or indirectly in a support arrangement such as suspension cradles disposed along its length. The pipe may also be supported in an elevated condition, such as for example in an installation in an industrial or chemical plant.

It is a particular feature of the pipe constructed in accordance with the example embodiments of the present invention that it can be constructed and then installed in position prior to curing of the resinous binder. In this way, the pipe may be in a flexible condition to facilitate it being guided into an installation position, with the pipe subsequently becoming rigid once in position upon curing of the resinous binder. With this arrangement, the pipe while in the flexible condition can be carried or otherwise conveyed into intended position and then installed prior to curing of the resinous binder.

Such an arrangement may be particularly advantageous in circumstances where a pipe in required to follow a path weaving around one or more obstructions or to otherwise follow a tortuous path. This can be a common occurrence for pipelines in industrial or chemical plant.

Figure 50:
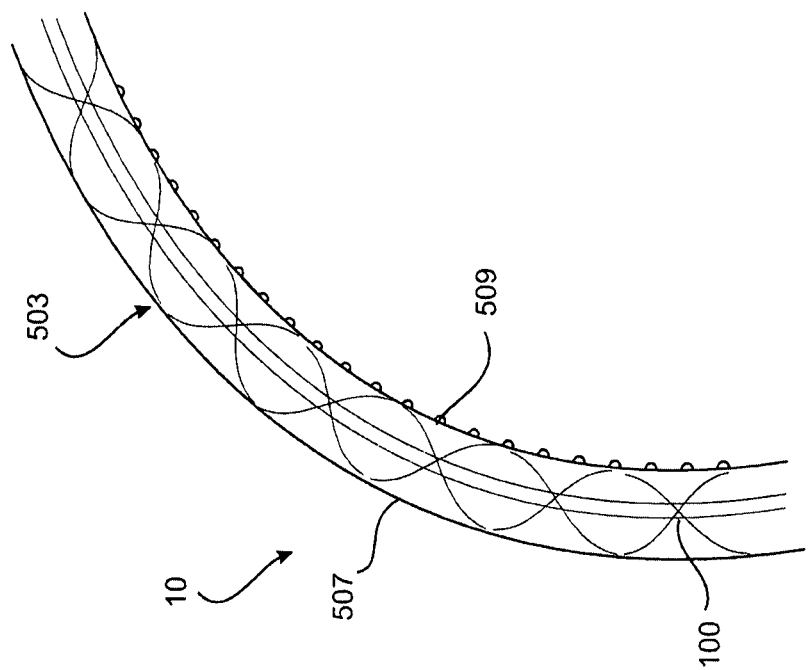
FIG. 50 is a fragmentary side view depicting a further section of the pipe according to a sixth embodiment, the section being configured as a bend section.
Figure 49:
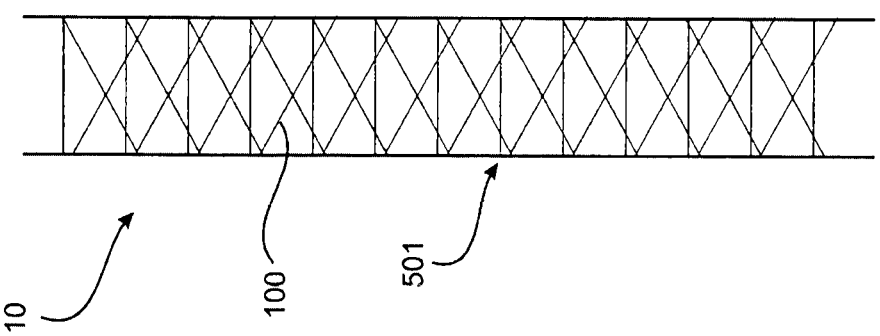
FIG. 49 is a fragmentary side view depicting a section of a pipe according to a sixth embodiment, the section being configured as a straight section.

Referring now to FIGS. 49 to 52, there is shown sections of a pipe 10 according to a sixth example embodiment. The pipe 10 according to the sixth embodiment incorporates one or more straight sections, one of which is depicted in FIG. 49 and identified by reference numeral 501. The pipe 10 also incorporates one or more bend sections, one possible form of which is depicted in FIG. 50 and identified by reference numeral 503, and another possible form of which is depicted in FIG. 51 and identified by reference numeral 505.

The bend section 503 is configured as a gentle curve having an outer side 507 and an inner side 509. The flexible outer casing 31 stretches on the outer side 507, and contracts on the inner side 509, to accommodate the curvature. The fibres within the reinforcement 32 are able to slip to also accommodate the curvature and spread the load.

The bend section 505 is configured as a tight curve having an outer side 511 and an inner side 513. The bend section 505 is formed by removing sections of the assembled tubular structure 100 adjacent the inner side 513, as shown in FIG. 52, to create recessed formations 515 along the inner side to facilitate folding of the tubular structure to form the assembled tube structure 100. In the arrangement shown, the removed sections are of a v-configuration such that each recessed formation 515 has two opposed inclined side edges 517 which abut in overlapping relation upon formation of the bend section 505, as shown in FIG. 51. The abutting edges 517 are sealing bonded together.

In certain applications there may be a need for the pipe 10, or at least a section of the length thereof, to be flexible after construction of the pipe and curing of the resinous binder. Such an application may involve a pipe 10 which provides a flexible pipeline extending between an underwater location and a facility at the water surface.

Figure 53:
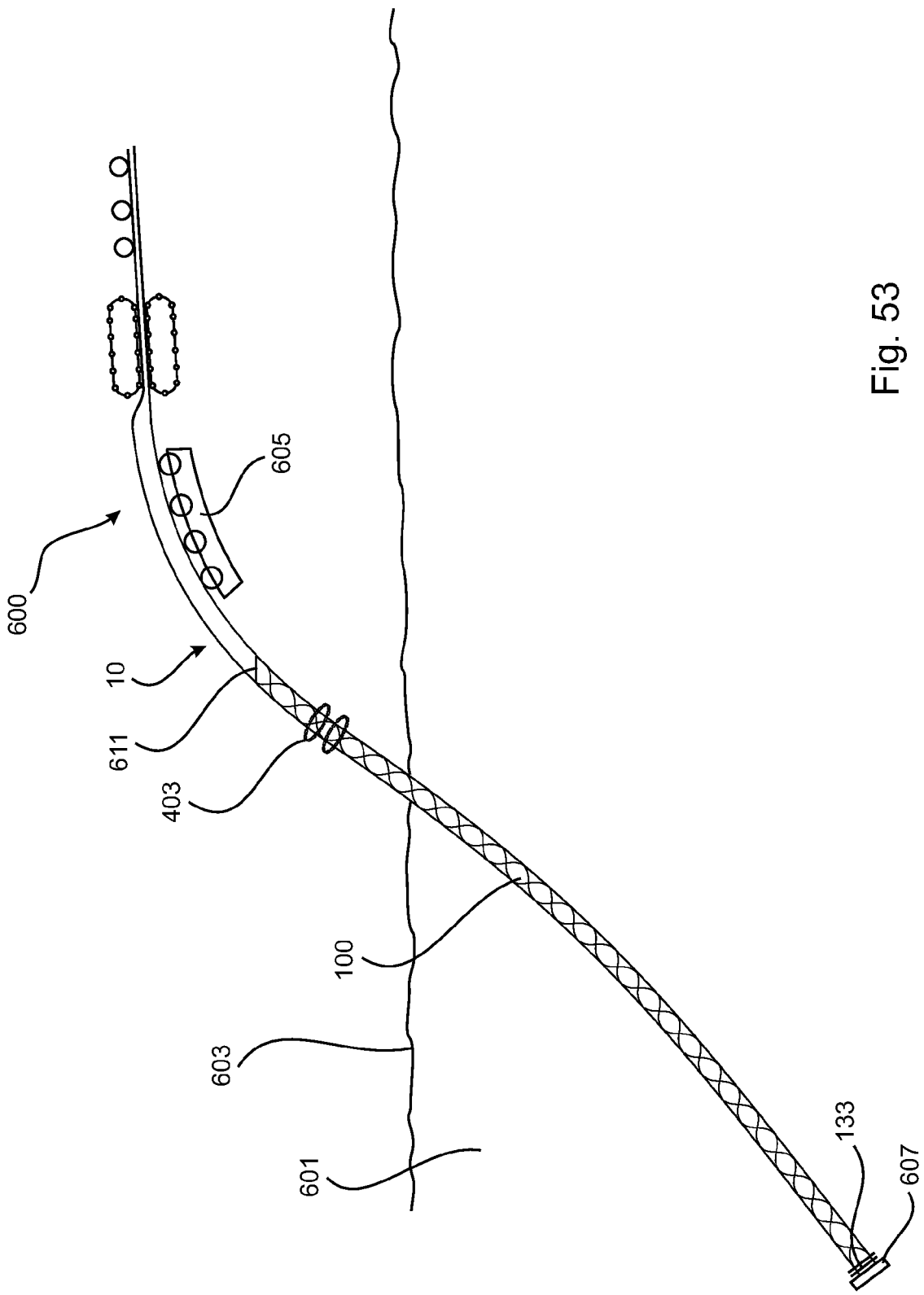
FIG. 53 is a schematic view of part of an assembly line for a pipe according to a seventh embodiment.

A pipe 10 according to a seventh example embodiment, which is shown in FIG. 53, is constructed for use in such an application. The pipe 10 may, for example, provide a flexible riser between a subsea location and an offshore production rig. In this embodiment, the pipe 10 is assembled at an installation plant 600 aboard a marine vessel such as a ship or a barge and is laid into a body of water 601, the surface of which is identified by reference numeral 603.

The installation plant 600 assembles the tubular structure 100 is a manner similar to the previous embodiments. In this embodiment, the installation plant 600 employs apparatus 403 to facilitate a relatively rapid wet-out of the reinforcement 32 and the adjacent resin absorbent layer 17 of the inner liner 21, as described previously in relation to the fifth embodiment. Additionally, the installation plant 600 has a support structure 605 to support the assembled tubular structure 100 as it is laid into the water 601.

In this embodiment, the resinous binder used in the construction of the pipe 10 hardens but to a more flexible state (as opposed to hardening to a rigid state as was typically the case with previous embodiments). Specifically, the resinous binder remains flexible after curing in order to provide the pipe 10 with the required flexibility. Resinous binders and other binding agents suitable for such purpose are well known in composite construction techniques and examples of which include rubber modified polyester, rubber modified vinyl ester, rubber modified epoxy and polyurethane. In this embodiment, rubber modified vinyl ester is preferred as the resinous binder, as it has high shear strength and good inter-laminar bonding but also affords the structure some ability to yield to accommodate movement.

Because of the need for the assembled tubular structure to descend in the water as the pipe 10 is laid, it may not be appropriate to use air as the inflation fluid for the inner liner 21 as air may provide undesirable buoyancy to the assembled tubular structure. In this embodiment, water is used as the inflation fluid. The water acting as the inflation fluid is sourced from the surrounding body of water 601. In the arrangement shown, the bottom of the descending tubular structure (being its commencement end 133) has a fitting 607 through which water can be pumped into the tube structure 100 to inflate the inner liner 21. The inflation fluid is introduced to establish and maintain a level above the water surface 603 in order to establish a pressure head for pressurizing the water sufficiently to inflate the liner 21 as necessary. The level of the water within the tube structure 100 above the water surface 603 is identified by reference numeral 611.

In this embodiment, the compression device 125 functions as a brake system to control the descent of the assembled tube structure 100 rather than applying traction for movement relative to the tubular structure as was the case with preceding embodiments.

The preceding example embodiments have related to construction of pipes of a length to constitute a pipeline extending continuously between two distant locations. The invention need not, however, be limited to construction of such long pipes. Indeed the invention may have application in the production of other pipes, such as for example production of pipes which are adapted to be connected one to another to form a pipeline and as such are typically of shorter length for handling and installation as individual units. The production of such pipes may be accommodated within a production facility such as a factory.

The next example embodiment, which is not shown in the drawings, is directed to such a pipe. The embodiment is similar in some respects to previous embodiments and corresponding terminology is thus adopted in the description of the embodiment.

In this embodiment, the inner portion is placed on a core (such as a mandrel) adapted for axial and radial expansion, and the outer portion is positioned about the inner portion to provide an assembled tube structure. The outer portion may be positioned about the inner portion before, during, or after placement of the inner portion on the core. The resinous binder impregnating the reinforcing fabric of the outer portion also impregnates the layer of felt on the inner liner to integrate the outer portion with the inner portion, as was the case with earlier embodiments. Prior to curing of the resinous binder, the core is expanded, thereby causing the assembled tube structure to expand both radially and axially, providing form and shape thereto. The expansion of the assembled tube structure stretches the reinforcement in the outer portion in all directions, serving to enhance hoop stress and axial stress bearing properties of the pipe 10, as was the case with previous embodiments. The assembled tube structure 100 can then be removed from the core once the resinous binder has cured sufficiently, thereby providing the pipe.

In this embodiment, the core is used to expand the assembled tube structure both radially and axially, rather than an inflation fluid as was the case with the earlier embodiments.

In another arrangement, a relatively short pipe can be produced by producing a pipe in accordance with any one of the first, second or third embodiments and then cutting the pipe into sections each constituting a short pipe.

A pipe in accordance with any of the preceding example embodiments may require a coupling at one or both of its ends. The coupling may be required to couple the pipe to other pipe in a pipeline, or to connect the pipe to another component (such as a filters, pump and valve). Further, it may be necessary to fit a coupling to a pipe at the start and end of a construction run in which the pipe is produced.

The couplings may be fitted to the pipe ends in any appropriate way. One way may involve a coupling device having an anchoring portion and a coupling portion, the anchoring portion being configured for attachment to the pipe and the coupling portion presenting a coupling part (such as a coupling flange) for attachment to a corresponding coupling part on another other pipe or component to which the pipe is to be coupled.

The anchoring portion may be adapted to be embedded in the adjacent end of the pipe 10. The anchoring portion may be configured to key with the pipe. The keying may be achieved in any suitable way, such as by provision of formation which keys with the outer portion 13 of the pipe 10. The formation may comprise lateral protrusions such as pins which key with the reinforcement 32 and the resinous binder impregnated therein. Alternatively, or additionally, the formation may comprise holes into which the reinforcement 32 and the resinous binder impregnated therein can locate to effect the keying action. Further, fibres in the reinforcement 32 can be wound about, inserted through, or otherwise attached to the formation to assist in securing the anchoring portion in position.

The preceding embodiments have related to construction of composite tubular structures configured as pipes.

The example embodiments of the present invention may have application to construction of any appropriate tubular structure, including for example, various tubular objects, elements, parts or other formations. The tubular structures may include structural elements such as shafts, beams and columns. The tubular structures may also include hollow structural sections of composite construction and also tubing.

Such tubular structures may be constructed in any appropriate way. A particularly convenient way of constructing such tubular structures may be similar to the process described in relation to an earlier embodiment involving a core (such as a mandrel) adapted for axial and radial expansion, and the outer portion is positioned about the inner portion to provide an assembled tube structure which constitutes the tubular structure.

The feature of applying vibration to the assembled tube structure 100 to excite the resinous binder and enhance the wetting process may be used in relation to the construction of any of the elongate hollow structures according to the invention.

From the foregoing it is apparent that it is a particular feature of the embodiments described that the step of delivering resinous binder to the reinforcement 32, and the step of fully wetting out the reinforcement 32 with the resinous binder, are separate and distinct actions. Specifically, resinous binder is introduced into the tube structure 100 before the latter passes through the compression device 125, and the resinous binder is caused to fully wet-out the reinforcement 32 following the introduction of inflation fluid into the inflation cavity 29 after the tube structure 100 has passed through the compression device 125.

Further, the progressive decrease in volume of the space 45 in which the reinforcement 32 is confined acts to positively expel air from within the space 45 which has the effect of enhancing impregnation of the resinous binder within the reinforcement 32, as previously described.

It should be appreciated that the scope of the invention is not limited to the scope of the example embodiments described.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claim defining the invention is as follows:

1. A method of constructing an elongate hollow structure, the elongate hollow structure having a radially inner portion and a radially outer portion, with the two portions merging together to provide an integrated tubular wall structure, the method comprising:
   providing the radially inner portion,
   assembling the radially outer portion about the radially inner portion, and
   radially expanding the inner portion,
   wherein the outer portion comprises an outer layer of fibre reinforced composite construction surrounded by a flexible outer casing, and wherein
   there is a space between the radially inner portion and the flexible outer casing,
   the outer layer of fibre reinforced composite construction comprises reinforcement and a binder,
   the flexible outer casing serves to resist radial expansion of the reinforcement, thereby causing it to be subjected to radial compression,
   the radially expanding inner portion operates in conjunction with the flexible outer casing to cause the volume of the space between the radially inner portion and the flexible outer casing to progressively decrease, thereby causing the binder within the reinforcement to spread through the space between the radially expanding inner portion and the flexible outer casing, and
   the flexible outer casing has less resilience than the radially expanding inner portion so as to yieldingly resist radial expansion of the inner portion.

2. The method of claim 1, wherein the reinforcement is impregnated with the binder and comprises one or more layers of reinforcing fabric.

3. The method of claim 2, wherein each of the one or more layers of reinforcing fabric is configured as a tubular layer disposed about the radially expanding inner portion.

4. The method of claim 3, wherein there is a plurality of tubular layers disposed one about another and about the radially expanding inner portion.

5. The method of claim 2, wherein the radially expanding inner portion includes an inner liner with a fibrous layer bonded onto one face thereof, wherein the binder impregnating the reinforcing fabric also impregnates the fibrous layer to integrate the outer portion with the inner portion.

6. The method of claim 3, wherein the binder is confined in the space between the radially expanding inner portion and the flexible outer casing, whereby the radially expanding inner portion operates in conjunction with the flexible outer casing to cause the volume of the space to progressively decrease thereby to cause expulsion of air from within the space.

7. The method of claim 6, wherein the outer casing and the various reinforcing fabric tubular layers are configured to facilitate expulsion of the air.

8. The method of claim 3, wherein the flexible outer casing has some resilience in order to yieldingly resist radial expansion of the reinforcing fabric tubular layers.

9. The method of claim 1, wherein the flexible outer casing has elasticity for the purpose of enhancing control of the rate at which the binder spreads through the space between the radially expanding inner portion and the flexible outer casing.

10. The method of claim 1, wherein the elongate hollow structure is constructed on a continuous basis and progressively installed in position prior to curing of the tubular wall structure, whereby the tubular wall structure cures once in the installed position of the elongate hollow structure.

11. A method of constructing a pipe on a continuous basis, comprising:
   forming a flexible tubular wall structure comprising a radially inner tube, a fibre-reinforced plastic composite, and a radially outer,
   inflating the inner tube to provide form and shape thereto, and
   curing the flexible wall structure to provide the pipe, wherein
   there is a space between the inner tube and the outer,
   the fibre reinforced composite construction comprises reinforcement and a binder and is located between the inner outer,
   the outer serves to resist radial expansion of the inner tube causing it to be subjected to radial compression, the radially expanding inner tube operates in conjunction with the outer to cause the volume of the space between the inner tube and the outer to progressively decrease, thereby causing the binder to spread through the space between the inner tube and the outer tube, and the outer tube has less resilience than the inner tube so as to yieldingly resist radial expansion of the inner tube.

12. The method of claim 11, wherein the pipe is in a flexible condition, the method further comprising:

laying the pipe at an installation site, and allowing the flexible pipe to transform into a rigid condition at the installation site.

13. The method of claim 12, wherein the pipe is assembled in a mobile installation plant which can move with respect to the installation site, laying the pipe in the flexible condition.

14. A mobile installation plant for constructing a pipe in accordance with the method of claim 11.

15. An assembly line for constructing an elongate hollow structure in accordance with the method of claim 1.

16. An elongate hollow structure constructed in accordance with the method of claim 1.

17. An elongate hollow structure of composite construction, comprising:

a radially inner portion, and a radially outer portion, wherein the two portions are merged together to provide an integrated tubular wall structure, and wherein the radially outer portion is configured as an outer tube of fibre reinforced composite construction including reinforcement, the radially outer portion is configured, at least during construction, as a flexible outer casing that serves to resist radial expansion of the reinforcement, thereby causing it to be subjected to radial compression, the inner portion and outer tube are spaced apart, the fibre reinforced composite construction comprises the reinforcement and a binder and is located between the inner portion and the outer, the outer serves to resist expansion of the inner portion causing the inner portion to be subjected to compression, the binder is spread between the inner portion and the outer due to the expansion of the inner portion, operating in conjunction with the outer to cause the volume of the space between the inner portion and the outer tube to progressively decrease during the formation of the elongate hollow structure, thereby causing the binder to spread through the space between the inner portion and the outer tube, and the flexible outer casing has less resilience than the radially expanding inner portion so as to yieldingly resist radial expansion of the inner portion.

18. The elongate hollow structure of claim 17, wherein the reinforcement is impregnated with the binder and comprises one or more layers of reinforcing fabric, each of the one or more layers of reinforcing fabric configured as a tubular layer disposed about the inner portion.

19. The elongate hollow structure of claim 18, wherein the reinforcing fabric comprises reinforcing fabric incorporating reinforcement fibres featuring quadraxial fibre orientations.

20. The elongate hollow structure of claim 17, wherein the inner portion comprises an inner liner with a fibrous layer bonded onto one face thereof.

21. The elongate hollow structure of claim 20, wherein a face of the inner liner other than the one face defines the interior surface of the tubular wall structure.

22. The elongate hollow structure of claim 18, wherein the inner portion further includes an inner liner with a fibrous layer bonded onto one face thereof, and resinous binder also impregnates the fibrous layer to integrate the outer portion with the inner portion.

23. The method of claim 1, wherein the fibre reinforced composite serves to increase the load bearing properties of the elongate hollow structure.

24. The method of claim 6, wherein the outer casing includes venting means to facilitate the expulsion of air.

25. The method of claim 1, wherein the inner portion is expanded by injecting an inflation fluid into the inner portion.

26. The method of claim 25, wherein the inner portion is expanded with inflation fluid that is introduced from an end of the elongate hollow structure.

27. The method of claim 25, wherein the elongate hollow structure is compressed at a location distal to an end from which the inflation fluid is introduced so that inflation fluid cannot pass through the location distal to the end.

28. The method of claim 27, wherein the elongate hollow structure passes through a compression device, and the compression device compresses the elongate hollow structure within it so that the inflation fluid cannot pass through the location distal to the end.

29. The method of claim 27, wherein the elongate hollow structure passes through a compression device, and the compression device acts to control the rate at which the elongate hollow structure is constructed.

30. The method of claim 27, wherein the elongate hollow structure passes through a compression device, and the compression device applies traction to the elongate hollow structure to facilitate continued construction of the elongate hollow structure.

31. The method of claim 1, wherein a bend is incorporated into the elongate hollow structure during construction so that the elongate hollow structure, when cured, includes at least one integral bend.

32. The method of claim 1, wherein an end of the elongate hollow structure is configured so as to securely receive an anchoring portion, the anchoring portion enabling the elongate hollow structure to couple to a second structure.

33. The method of claim 1, wherein the binder is caused to spread throughout the space so as to completely fill the space between the radially inner portion and the flexible outer casing, as the volume of the space between the radially inner portion and the flexible outer casing is progressively decreased.

* * * * *